United States Patent
Luo et al.

(10) Patent No.: US 10,409,402 B2
(45) Date of Patent: Sep. 10, 2019

(54) TOUCH DRIVING UNIT FOR TOUCH DISPLAY PANEL HAVING COMMON ELECTRODE MULTIPLEXED AS TOUCH ELECTRODE AND DRIVING METHOD THEREOF, TOUCH DRIVING CIRCUIT AND DISPLAY

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Hao Luo, Beijing (CN); Wen Tan, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 154 days.

(21) Appl. No.: 15/504,475

(22) PCT Filed: Aug. 4, 2016

(86) PCT No.: PCT/CN2016/093241
§ 371 (c)(1),
(2) Date: Feb. 16, 2017

(87) PCT Pub. No.: WO2017/118005
PCT Pub. Date: Jul. 13, 2017

(65) Prior Publication Data
US 2018/0348922 A1    Dec. 6, 2018

(30) Foreign Application Priority Data
Jan. 4, 2016    (CN) .......................... 2016 1 0005489

(51) Int. Cl.
G06F 3/041    (2006.01)
G09G 3/20    (2006.01)
G06F 3/044    (2006.01)

(52) U.S. Cl.
CPC .......... G06F 3/0412 (2013.01); G06F 3/0416 (2013.01); G09G 3/20 (2013.01);
(Continued)

(58) Field of Classification Search
CPC ...... G06F 3/0412; G06F 3/0416; G06F 3/041; G06F 3/044
See application file for complete search history.

(56) References Cited

U.S. PATENT DOCUMENTS 9,218,779 B2 * 12/2015 Kim ..................... G09G 3/3696
9,530,341 B2 * 12/2016 Cheng ..................... H01L 27/12
(Continued)

FOREIGN PATENT DOCUMENTS

| CN | 104217763 A | 12/2014 |
| CN | 104393874 A | 3/2015 |

(Continued)

OTHER PUBLICATIONS

International Search Report and Written Opinion dated Oct. 26, 2016: PCT/CN2016/093241.
(Continued)

*Primary Examiner* — Vijay Shankar
(74) *Attorney, Agent, or Firm* — Ladas & Parry LLP

(57) ABSTRACT

A touch driving unit for a touch display panel and a driving method thereof, a touch driving circuit and a display device. The touch driving unit includes at least two transistors of a same type. Common electrodes of the touch display panel are multiplexed as touch electrodes; and the touch driving unit is integrated on an array substrate of the touch display panel and is connected with the common electrodes, and the (Continued)

touch driving unit is configured to output common voltages or touch driving signals to the common electrodes.

19 Claims, 9 Drawing Sheets

(52) U.S. Cl.
CPC ........ *G02F 2201/121* (2013.01); *G06F 3/044* (2013.01); *G09G 2310/08* (2013.01); *G09G 2354/00* (2013.01)

(56) References Cited

U.S. PATENT DOCUMENTS

| | | | |
|---|---|---|---|
| 9,715,296 B2* | 7/2017 | Wang | G11C 19/28 |
| 9,766,764 B2* | 9/2017 | Kim | G06F 3/044 |
| 9,851,832 B2* | 12/2017 | Yang | G06F 3/044 |
| 9,880,687 B2* | 1/2018 | Lee | G06F 3/044 |
| 2016/0027356 A1* | 1/2016 | Cheng | H01L 27/12 345/173 |
| 2016/0246418 A1* | 8/2016 | Wang | G11C 19/28 |
| 2016/0299614 A1* | 10/2016 | Yang | G06F 3/044 |

FOREIGN PATENT DOCUMENTS

| | | |
|---|---|---|
| CN | 104866141 A | 8/2015 |
| CN | 105117087 A | 12/2015 |
| CN | 105446544 A | 3/2016 |

OTHER PUBLICATIONS

The First Chinese Office Action dated Oct. 18, 2017; Appln. No. 201610005489.0.

* cited by examiner

TOUCH DRIVING UNIT FOR TOUCH DISPLAY PANEL HAVING COMMON ELECTRODE MULTIPLEXED AS TOUCH ELECTRODE AND DRIVING METHOD THEREOF, TOUCH DRIVING CIRCUIT AND DISPLAY

TECHNICAL FIELD

Embodiments of the present disclosure relate to a touch driving unit and a driving method thereof, a touch driving circuit and a display device.

BACKGROUND

With the continuous development of the display technology, display devices have been widely applied in various electronic devices (for instance, mobile phones, personal digital assistants (PDAs), digital cameras, computer screens and notebook computer screens). In order to further achieve human-machine interaction and improve user experience, a touch display panel is provided in the prior art, and an in-cell touch display panel is even a mainstream in the development of the touch display technology.

SUMMARY

In a first aspect, embodiments of the present disclosure provide a touch driving unit that includes at least two transistors of a same type. Common electrodes of the touch display panel are multiplexed as touch electrodes; and the touch driving unit is integrated on an array substrate of the touch display panel and is connected with the common electrodes, and the touch driving unit is configured to output common voltages or touch driving signals to the common electrodes.

In a second aspect, embodiments of the present disclosure provide a touch driving circuit that includes the touch driving unit.

In a third aspect, embodiments of the present disclosure provide a driving method for driving the touch driving unit, comprising:

in a first stage of a display period: pulling the voltage of the first node to be equal to the voltage of the first voltage-level terminal through the first node control module under the control of the first clock signal inputted by the first clock signal terminal; storing, through the first energy storage module. the voltage of the first node; and, through the output module under the control of the voltage of the first node, pulling the voltage of the first output terminal to be equal to the voltage of the second voltage-level terminal, and outputting, at the second output terminal, the common voltage inputted by the common voltage input terminal;

in a second stage of the display period: pulling the voltage of the first output terminal to be equal to the voltage of the second voltage-level terminal through the output module under the control of the voltage of the first node; and outputting, at the second output terminal, the common voltage inputted by the common voltage input terminal through the output module under the control of the fourth clock signal inputted by the fourth clock signal terminal;

in a third stage of the display period: pulling the voltage of the first output terminal to be equal to the voltage of the second voltage-level terminal and outputting, at the second output terminal, the common voltage inputted by the common voltage input terminal through the output module under the control of the voltage of the first node;

in a fourth stage of the display period: pulling the voltage of the first node to be equal to the voltage of the first voltage-level terminal through the first node control module under the control of the second clock signal of the second clock signal terminal; storing, by the first energy storage module, the voltage of the first node; and outputting, at the second output terminal, the common voltage inputted by the common voltage input terminal through the output module under the control of the voltage of the first node;

in a first stage of a touch period: pulling the voltage of the first node to be equal to the voltage of the second voltage-level terminal through the first node control module under the control of the first input signal inputted by the first input terminal; pulling the voltage of the second node to be equal to the voltage of the first voltage-level terminal through the second node control module under the control of the first input signal inputted by the first input terminal and the voltage of the first node; storing, by the second energy storage module, the voltage of the second node; and outputting, at the second output terminal, the common voltage inputted by the common voltage input terminal through the output module under the control of the voltage of the fourth clock signal terminal; and in a second stage of the touch period: outputting, at the first output terminal, the third clock signal of the third clock signal terminal through the output module under the control of the voltage of the second node; and outputting, at the second output terminal, the driving signal inputted by the driving signal input terminal through the output module under the control of the third clock signal inputted by the third clock signal terminal.

In a fourth aspect, embodiments of the present disclosure provide a driving method for driving the touch driving unit, comprising:

in a first stage of a display period: pulling the voltage of the first node to be equal to the voltage of the first voltage-level terminal through the first node control module under the control of the first clock signal of the first clock signal terminal; storing, by the first energy storage module, the voltage of the first node; outputting, at the first output terminal, the common voltage inputted by the common voltage input terminal through the first output module under the control of the voltage of the first node; and, through the second output module under the control of the voltage of the first node, pulling the voltage of the second output terminal to be equal to the voltage of the second voltage-level terminal, and outputting, at the third output terminal, the common voltage inputted by the common voltage input terminal;

in a second stage of the display period: outputting, at the first output terminal, the common voltage inputted by the common voltage input terminal through the first output module under the control of the fourth clock signal inputted by the fourth clock signal terminal; pulling the voltage of the second output terminal to be equal to the voltage of the second voltage-level terminal through the second output module under the control of the voltage of the first node; and outputting, at the third output terminal, the common voltage inputted by the common voltage input terminal through the second output module under the control of the fourth clock signal inputted by the fourth clock signal terminal;

in a third stage of the display period: outputting, at the first output terminal, the common voltage inputted by the common voltage input terminal through the first output module under the control of the voltage of the first node; pulling the voltage of the second output terminal to be equal to the voltage of the second voltage-level terminal through the second output module under the control of the voltage of the first node; and outputting, at the third output terminal, the common voltage inputted by the common voltage input terminal through the second output module under the control of the second clock signal inputted by the second clock signal terminal;

in a fourth stage of the display period: outputting, at the first output terminal, the common voltage inputted by the common voltage input terminal through the first output module under the control of the third clock signal inputted by the third clock signal terminal; pulling the voltage of the second output terminal to be equal to the voltage of the second voltage-level terminal through the second output module under the control of the voltage of the first node; and outputting, at the third output terminal, the common voltage inputted by the common voltage input terminal through the second output module under the control of the second clock signal inputted by the second clock signal terminal;

in a first stage of a touch period, pulling the voltage of the first node to be equal to the voltage of the second voltage-level terminal through the first node control module under the control of the first input signal inputted by the first input terminal; pulling the voltage of the second node to be equal to the voltage of the first voltage-level terminal through the second node control module under the control of the voltage of the first node and the first input signal inputted by the first input terminal; outputting, at the first output terminal, the common voltage inputted by the common voltage input terminal through the first output module under the control of the fourth clock signal inputted by the fourth clock signal terminal; and outputting, at the third output terminal, the common voltage inputted by the common voltage input terminal through the second output module under the control of the fourth clock signal of the fourth clock signal terminal;

in a second stage of the touch period: outputting, at the first output terminal, the driving signal inputted by the driving signal input terminal through the first output module under the control of the voltage of the second node and the second clock signal inputted by the second clock signal terminal; and outputting, at the third output terminal, the common voltage inputted by the common voltage input terminal through the second output terminal under the control of the second clock signal inputted by the second clock signal terminal; and in a third stage of the touch period: outputting, at the first output terminal, the common voltage inputted by the common voltage input terminal through the first output module under the control of the third clock signal of the third clock signal terminal; outputting, at the second output terminal, the third clock signal of the third clock signal terminal through the second output module under the control of the voltage of the second node, and outputting, at the third output terminal, the driving signal inputted by the driving signal input terminal through the second output module under the control of the third clock signal inputted by the third clock signal terminal.

In a fifth aspect, embodiments of the present disclosure provide a display device, comprising the touch driving circuit.

BRIEF DESCRIPTION OF THE DRAWINGS

In order to illustrate the technical solutions in the embodiments of the present disclosure or the existing arts more clearly, the drawings need to be used in the description of the embodiments or the existing arts will be briefly described in the following; it is obvious that the drawings described below are only related to some embodiments of the present disclosure, for one ordinary skilled person in the art, other drawings can be obtained according to these drawings without making other inventive work.

DETAILED DESCRIPTION

Figure 1:
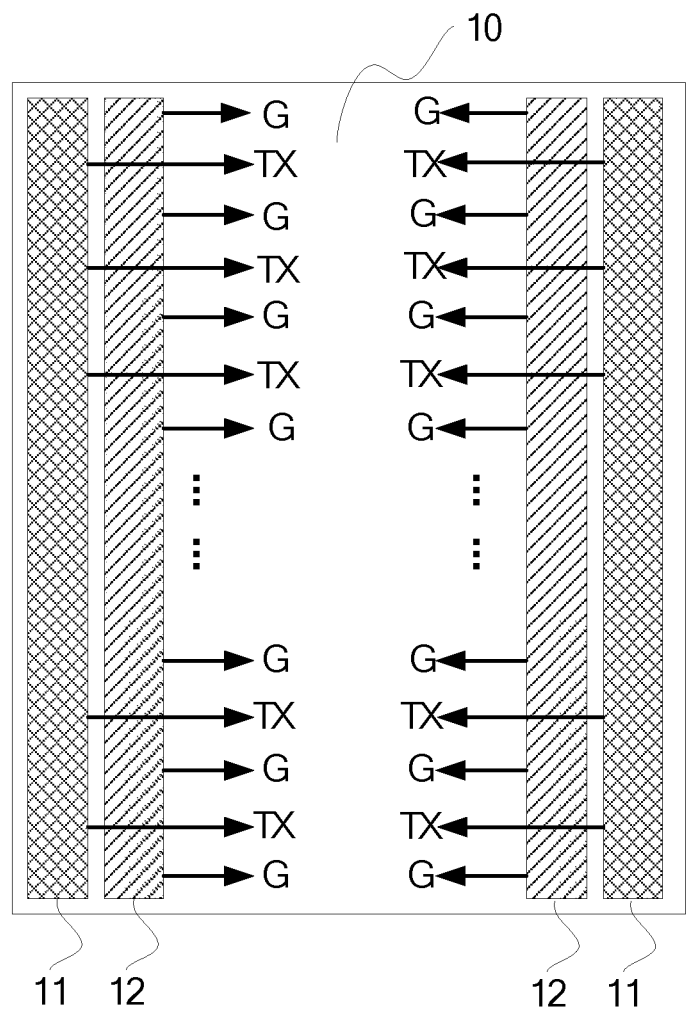
FIG. 1 is a schematic structural view of a touch display panel provided by an embodiment of the present disclosure.

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. Based on embodiments of the present disclosure, all other embodiments obtained by those skilled in the art without making other inventive work should be within the scope of the present disclosure.

A proposal of the touch display technology includes: a common electrode layer of a display panel is divided and multiplexed as touch electrodes; in the touch display process, the time duration of one frame is divided into a display period and a touch period; in the display period, common voltage signals are applied to the common electrode layer; and in the touch period, touch driving signals are applied to the common electrode layer which is multiplexed as the touch electrodes, where the touch driving signals of the touch electrodes are provided by an external touch driver IC through emission electrodes disposed in a sealing area. However, with the increased size of the display panel, the number of the emission electrodes in the sealing area is also continuously increased, and the space of the sealing area is needed to be increased to accommodate the emission electrodes. Thus, the application of the in-cell touch technology on large-size and narrow-bezel in-cell touch display panels can be limited. On the other hand, as the emission electrodes are disposed above or below a gate driver on array (GOA), mutual crosstalk may be produced between gate driving signals of the GOA and touch driving signals of the touch driving unit, causing reliability problems in the touch and display of the touch display panel. In order to solve the above problems, the relevant prior art provides an integrated touch driving unit design in which touch driving units are integrated into a complementary metal oxide semiconductor (CMOS) structure of a sealing area of an array substrate. However, as the integrated touch driving unit simultaneously includes N-type thin-film transistors (TFTs) and P-type TFTs and active layers of different types of TFTs have different doping materials, the manufacturing process of the integrated touch driving unit in the relevant prior art is relatively difficult, and hence the production cost of the touch display panel is increased.

Embodiments of the present disclosure provide a touch driving unit and a driving method thereof, a touch driving circuit and a display device, which are used for reducing the difficulty in the manufacturing process of the integrated touch driving unit and hence reducing the production cost of the touch display panel.

Transistors adopted in all the embodiments of the present disclosure may be TFTs, field effect transistors (FETs) or other elements with same characteristics. The transistors adopted in the embodiments of the present disclosure are mainly switching transistors according to the function of the transistors in a circuit. As source electrodes and drain electrodes of the switching transistors adopted herein are symmetrical, the source electrodes and the drain electrodes of the transistors may be exchanged. In the embodiments of the present disclosure, in order to distinguish two electrodes of the transistor except a gate electrode, the source electrode of the transistor is taken as a first terminal and the drain electrode is taken as a second terminal. Or, the drain electrode of the transistor is taken as the first terminal and the source electrode is taken as the second terminal. According to the illustrative form specified in the figures, an intermediate terminal of the transistor is the gate electrode; a signal input terminal is the source electrode; and a signal output terminal is the drain electrode. In addition, the switching transistors adopted in the embodiments of the present disclosure include P-type switching transistors and N-type switching transistors, in which a P-type switching transistor is switched on when the gate electrode is loaded with a low level signal and switched off when the gate electrode is loaded with a high level signal, and an N-type switching transistor is switched on when the gate electrode is loaded with a high level signal and switched off when the gate electrode is loaded with a low level signal.

The touch driving unit and the touch driving circuit provided by the embodiments of the present disclosure are applied in an in-cell touch display panel. In order to avoid the limitation of the traditional touch driving circuit in large-size and narrow-bezel in-cell touch display panels, in the embodiments of the present disclosure the touch driving circuit is integrated on an array substrate of the touch display panel. For instance, as illustrated in FIG. 1, touch driving circuits 11 are integrated on an array substrate 10 and disposed on the outside of GOA circuits 12; the touch driving circuits 11 are connected with common electrode lines TX; the common electrode lines are connected with common electrodes (not shown in FIG. 1); and the GOA circuits are connected with gate lines G. Meanwhile, transistors in the touch driving unit and the touch driving circuit provided by the embodiments of the present disclosure are of the same type; for instance, the transistors are all N-type transistors or are all P-type transistors. Therefore, the touch display circuit provided by the embodiments of the present disclosure not only can be adapted to the large-size and narrow-bezel in-cell touch display panel but also can reduce the difficulty in the manufacturing process of the integrated touch driving unit and hence reduce the production cost of the touch display panel.

An embodiment of the present disclosure provides a touch driving unit. The touch driving unit is applied in a touch display panel; common electrodes of the touch display panel are divided and multiplexed as touch electrodes; the touch driving unit is integrated on an array substrate of the touch display panel, is connected with the common electrodes, and is configured to output common voltages or touch driving signals to the common electrodes; and the touch driving unit includes at least two transistors of the same type. For instance, the transistors are all N-type transistors or P-type transistors.

Illustratively, the touch driving unit may be integrated into a sealing area of the array substrate of the touch display panel.

The touch driving unit provided by the embodiments of the present disclosure is integrated on the array substrate of the in-cell touch display panel, connected with the touch electrodes, and configured to output the common voltages or the touch driving signals to the common electrodes. Thus, the touch driving unit provided by the embodiments of the present disclosure can provide the common voltages for the common electrodes in the display period and provide the touch driving signals for the common electrodes multiplexed as the touch electrodes in the touch period, so as to achieve the driving of the touch display panel. Moreover, the touch driving unit includes at least two transistors. The transistors are all N-type or P-type. Therefore, the embodiments of the present disclosure can reduce the difficulty in the manufacturing process of the integrated touch driving unit and hence reduce the production cost of the touch display panel.

First Embodiment

Figure 2:
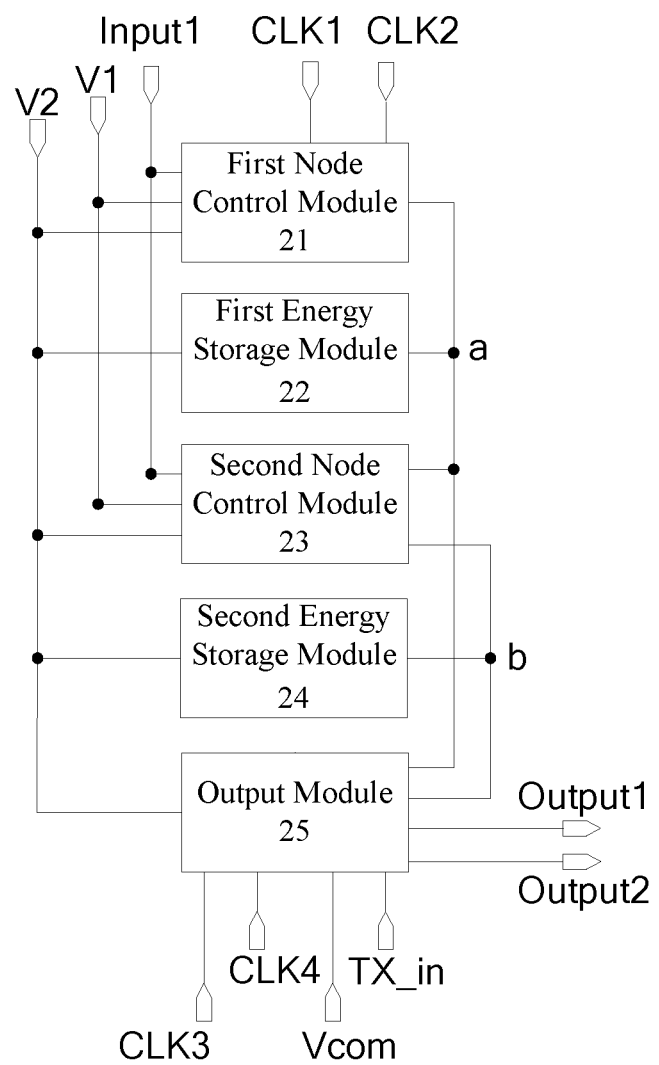
FIG. 2 is a schematic structural view of a touch driving unit provided by an embodiment of the present disclosure.

As illustrated in FIG. 2, the touch driving unit comprises: a first node control module 21, a first energy storage module 22, a second node control module 23, a second energy storage module 24 and an output module 25.

The first node control module 21 is connected with a first voltage-level terminal V1, a second voltage-level terminal V2, a first input terminal Input1, a first clock signal terminal CLK1, a second clock signal terminal CLK2 and a first node a. The first node control module 21 is configured to pull the voltage of the first node a to be equal to the voltage of the first voltage-level terminal V1 or the voltage of the second voltage-level terminal V2 under the control of a first clock signal inputted by the first clock signal terminal CLK1, a second clock signal inputted by the second clock signal terminal CLK2 and a first input signal inputted by the first input terminal Input1.

The first energy storage module 22 is connected with the first node a and the second voltage-level terminal V2 and configured to store the voltage of the first node a.

The second node control module 23 is connected with the first voltage-level terminal V1, the second voltage-level terminal V2, the first input terminal Input1, the first node a and a second node b. The second node control module 23 is configured to pull the voltage of the second node b to be equal to the voltage of the first voltage-level terminal V1 or the voltage of the second voltage-level terminal V2 under the control of the first input signal inputted by the first input terminal Input1 and the voltage of the first node a.

The second energy storage module 24 is connected with the second node b and the second voltage-level terminal V2 and configured to store the voltage of the second node b.

The output module 25 is connected with the second voltage-level terminal V2, the first node a, the second node b, a third clock signal terminal CLK3, a fourth clock signal terminal CLK4, a driving signal input terminal TX_in, a common voltage input terminal Vcom, a first output terminal Output1 and a second output terminal Output2. The output module 25 is configured to: under the control of the voltage of the first node a and the voltage of the second node b, output at the first output terminal Output1 a third clock signal that is inputted by the third clock signal terminal CLK3, or pull the voltage of the first output terminal Output1 to be equal to the voltage of the second voltage-level terminal V2; and, under the control of the voltage of the first node a, the voltage of the second node b, the third clock signal inputted by the third clock signal terminal CLK3 and the fourth clock signal inputted by the fourth clock signal terminal CLK4, output at the second output terminal Output2 a driving signal inputted by the driving signal input terminal TX_in or the common voltage inputted by the common voltage input terminal Vcom.

Figure 3:
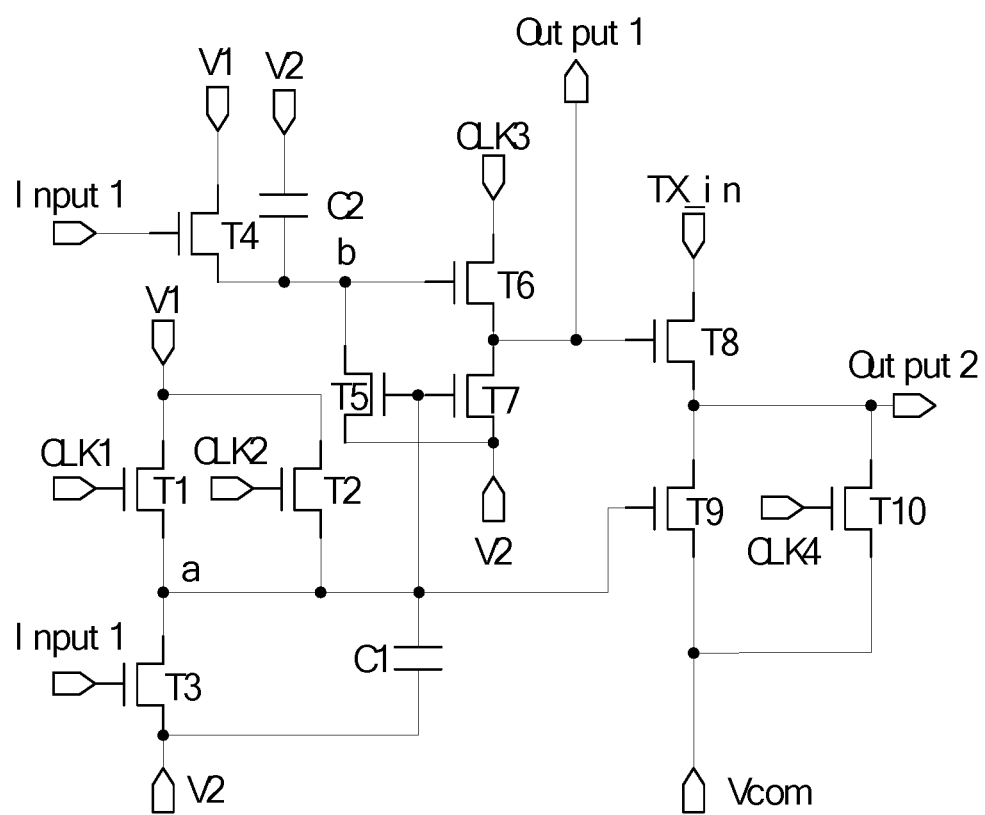
FIG. 3 is a circuit diagram of a touch driving unit provided by an embodiment of the present disclosure.

Moreover, as illustrated in FIG. 3, the first node control module 21 includes: a first transistor T1, a second transistor T2 and a third transistor T3.

A first terminal of the first transistor T1 is connected with the first voltage-level terminal V1; a second terminal of the first transistor T1 is connected with the first node a; and a gate electrode of the first transistor T1 is connected with the first clock signal terminal CLK1.

A first terminal of the second transistor T2 is connected with the first voltage-level terminal V1; a second terminal of the second transistor T2 is connected with the first node a; and a gate electrode of the second transistor T2 is connected with the second clock signal terminal CLK2.

A first terminal of the third transistor T3 is connected with the first node a; a second terminal of the third transistor T3 is connected with the second voltage-level terminal V2; and a gate electrode of the third transistor T3 is connected with the first input terminal Input The first energy storage module 22 includes: a first capacitor C1.

A first end of the first capacitor C1 is connected with the first node a, and a second end of the first capacitor C1 is connected with the second voltage-level terminal V2.

The second node control module 23 includes: a fourth transistor T4 and a fifth transistor T5.

A first terminal of the fourth transistor T4 is connected with the first voltage-level terminal V1; a second terminal of the fourth transistor T4 is connected with the second node b; and a gate electrode of the fourth transistor T4 is connected with the first input terminal Input1.

A first terminal of the fifth transistor T5 is connected with the second node b; a second terminal of the fifth transistor T5 is connected with the second voltage-level terminal V2; and a gate electrode of the fifth transistor T5 is connected with the first node a.

The second energy storage module 24 includes: a second capacitor C2.

A first end of the second capacitor C2 is connected with the second node b, and a second end of the second capacitor C2 is connected with the second voltage-level terminal V2.

The output module 25 includes: a sixth transistor T6, a seventh transistor T7, an eighth transistor T8, a ninth transistor T9 and a tenth transistor T10.

A first terminal of the sixth transistor T6 is connected with the third clock signal terminal CLK3; a second terminal of the sixth transistor T6 is connected with the first output terminal Output1; and a gate electrode of the sixth transistor T6 is connected with the second node b.

A first terminal of the seventh transistor T7 is connected with the first output terminal Output!; a second terminal of the seventh transistor T7 is connected with the second voltage-level terminal V2; and a gate electrode of the seventh transistor T7 is connected with the first node a.

A first terminal of the eighth transistor T8 is connected with the driving signal input terminal TX_in; a second terminal of the eighth transistor T8 is connected with the second output terminal Output2; and a gate electrode of the eighth transistor T8 is connected with the first output terminal Output1.

A first terminal of the ninth transistor T9 is connected with the second output terminal Output2; a second terminal of the ninth transistor T9 is connected with the common voltage input terminal Vcom; and a gate electrode of the ninth transistor T9 is connected with the first node a.

A first terminal of the tenth transistor T10 is connected with the second output terminal Output2; a second terminal of the tenth transistor T10 is connected with the common voltage input terminal Vcom; and a gate electrode of the tenth transistor T10 is connected with the fourth clock signal terminal CLK4.

An embodiment of the present disclosure further provides a driving method for driving the touch driving unit. The method comprises:

in a first stage of a display period: pulling the voltage of the first node to be equal to the voltage of the first voltage-level terminal through the first node control module under the control of the first clock signal inputted by the first clock signal terminal; storing, through the first energy storage module, the voltage of the first node; and, through the output module under the control of the voltage of the first node, pulling the voltage of the first output terminal to be equal to the voltage of the second voltage-level terminal, and outputting, at the second output terminal, the common voltage inputted by the common voltage input terminal;

in a second stage of the display period, pulling the voltage of the first output terminal to be equal to the voltage of the second voltage-level terminal through the output module under the control of the voltage of the first node, and outputting, at the second output terminal, the common voltage inputted by the common voltage input terminal through the output module under the control of the fourth clock signal inputted by the fourth clock signal terminal;

in a third stage of the display period, pulling the voltage of the first output terminal to be equal to the voltage of the second voltage-level terminal and outputting, at the second output terminal, the common voltage inputted by the common voltage input terminal through the output module under the control of the voltage of the first node;

in a fourth stage of the display period, pulling the voltage of the first node to be equal to the voltage of the first voltage-level terminal through the first node control module under the control of the second clock signal of the second clock signal terminal; storing, by the first energy storage module, the voltage of the first node; and outputting, at the second output terminal, the common voltage inputted by the common voltage input terminal through the output module under the control of the voltage of the first node;

in a first stage of a touch period, pulling the voltage of the first node to be equal to the voltage of the second voltage-level terminal through the first node control module under the control of the first input signal inputted by the first input terminal; pulling the voltage of the second node to be equal to the voltage of the first voltage-level terminal through the second node control module under the control of the first input signal inputted by the first input terminal and the voltage of the first node; storing, by the second energy storage module, the voltage of the second node; and outputting, at the second output terminal, the common voltage inputted by the common voltage input terminal through the output module under the control of the voltage of the fourth clock signal terminal;

in a second stage of the touch period, outputting, at the first output terminal, the third clock signal of the third clock signal terminal through the output module under the control of the voltage of the second node; and outputting, at the second output terminal, the driving signal inputted by the driving signal input terminal through the output module under the control of the third clock signal inputted by the third clock signal terminal.

Figure 4:
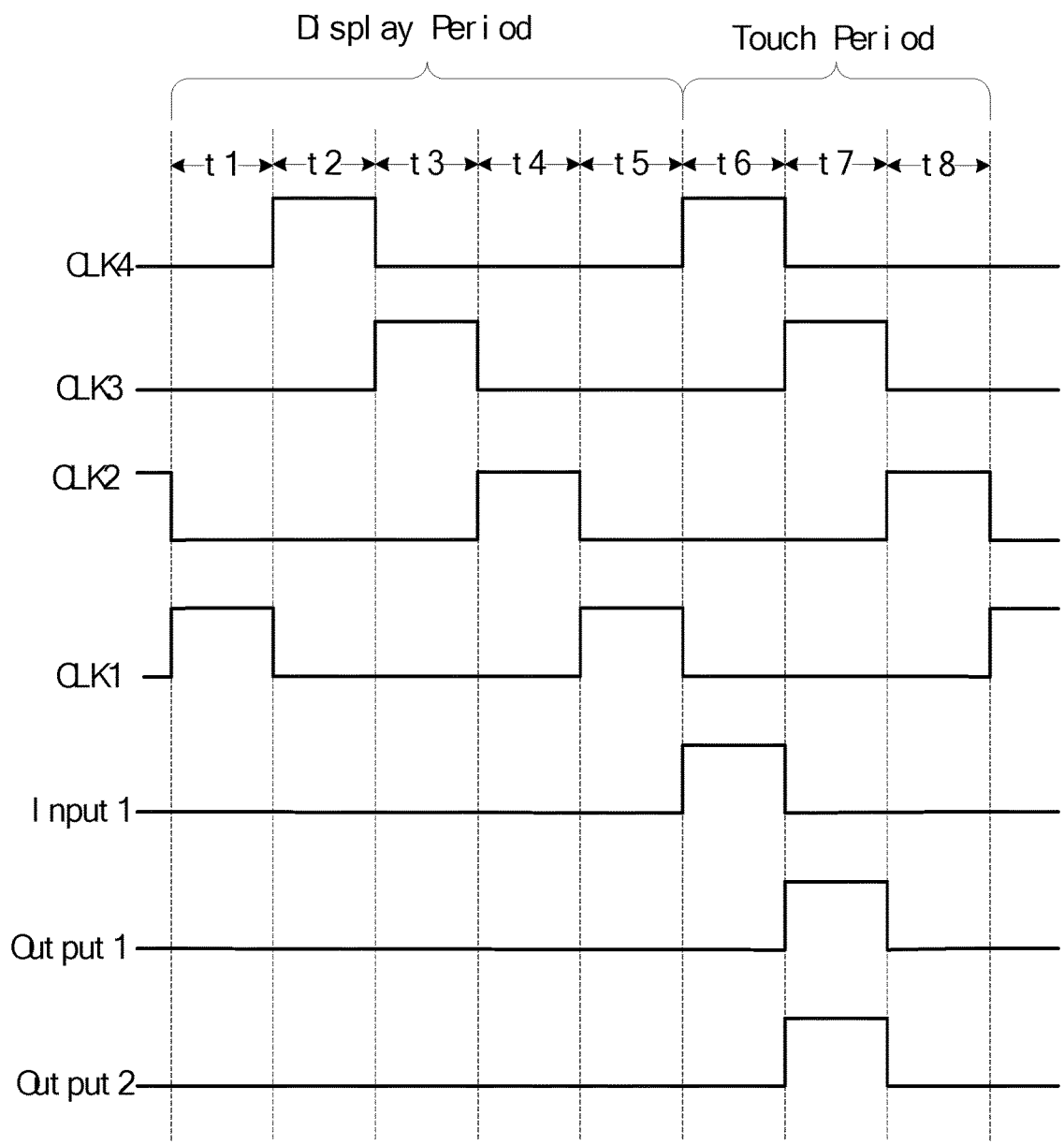
FIG. 4 is a schematic diagram illustrating a timing sequence status of signals in the touch driving unit as shown in FIG. 3 provided by an embodiment of the present disclosure.

Description will be given below to the working principle of the touch driving unit as shown in FIG. 3 with reference to the schematic timing sequence status diagram as shown in FIG. 4. Description is given by taking the case as an example that all the transistors in the touch driving unit as shown in FIG. 3 are N-type transistors which are switched on when the gate electrodes are applied with a high level signal. FIG. 4 illustrates the timing sequence status of the first clock signal terminal CLK1, the second clock signal terminal CLK2, the third clock signal terminal CLK3, the fourth clock signal terminal CLK4, the first input terminal Input1, the first output terminal Output1 and the second output terminal Output2. In addition, in the embodiment, the first voltage-level terminal V1 provides a high level voltage; the second voltage-level terminal V2 provides a low level voltage; the driving signal input terminal TX_in provides a touch driving signal; and the common voltage terminal Vcom provides a common voltage. Illustratively, the second voltage-level terminal V2 may be a ground terminal. For instance, description is given to the working principle of the touch driving unit in the display period and the touch period respectively, in which the display period includes: a first stage t1, a second stage t2, a third stage t3, a fourth stage t4 and a fifth stage t5; and the touch period includes: a sixth stage t6, a seventh stage t7 and an eighth stage t8.

In the t1 stage, CLK1 is at the high voltage level; T1 is switched on; V1 charges the node a through T1; the voltage of the node a is at the high voltage level; C1 stores the high level voltage of the node a; T5, T7 and T9 are switched on; the node b is connected with V2 through T5, and the voltage of the node b is at the low voltage level; Output1 is connected with V2 through T7, and the voltage of Output1 is at the low voltage level; and Output2 is connected with Vcom through T9 and outputs the common voltage of Vcom. In addition, in the t1 stage, other input signals are all at the low voltage level, so that other transistors are all switched off in this stage.

In the t2 stage, CLK4 is at the high voltage level; as CLK1, CLK3 and Input1 are all at the low voltage level in this stage, T1, T2 and T3 are switched off; the node a may maintain the high voltage level through C1; T5, T7 and T9 are switched on; the node b is connected with V2 through T5, and the voltage of the node b is at the low voltage level; Output1 is connected with V2 through T7, and the voltage of Output1 is at the low voltage level; moreover, as CLK4 is at the high voltage level, T10 is switched on; and Output2 is connected with Vcom through T9 and T10 and outputs the common voltage of Vcom. In addition, in the t2 stage, other input signals are all at the low voltage level, so that other transistors are all switched off in this stage.

In the t3 stage, CLK3 is at the high voltage level; as CLK1, CLK2 and Input1 are all at the low voltage level in this stage, T1, T2 and T3 are switched off; the node a may maintain the high voltage level through C1; T5, T7 and T9 are switched on; the node b is connected with V2 through T5, and the voltage of the node b is at the low voltage level; Output1 is connected with V2 through T7, and the voltage of Output1 is at the low voltage level; and Output2 is connected with Vcom through T9 and outputs the common voltage of Vcom. As the voltage of b is at the low voltage level, T6 is switched off, and the high level outputted by CLK3 is not inputted. In addition, in the t3 stage, other input signals are all at the low voltage level, so that other transistors are all switched off in this stage.

In the t4 stage, CLK2 is at the high voltage level; T2 is switched on; V1 charges the node a through T2; the voltage of the node a is at the high voltage level; C1 stores the high level voltage of the node a; T5, T7 and T9 are switched on; the node b is connected with V2 through T5, and the voltage of the node b is at the low voltage level; Output1 is connected with V2 through T7, and the voltage of Output1 is at the low voltage level; and Output2 is connected with Vcom through T9 and outputs the common voltage of Vcom. In addition, in the t4 stage, other input signals are all at the low voltage level, so that other transistors are all switched off in this stage.

In the t5 stage, CLK1 is at the high voltage level; T1 is switched on; V1 charges the node a through T1; the voltage of the node a is at the high voltage level; C1 stores the high level voltage of the node a; T5, T7 and T9 are switched on; the node b is connected with V2 through T5, and the voltage of the node b is at the low voltage level; Output1 is connected with V2 through T7, and the voltage of Output1 is at the low voltage level; and Output2 is connected with Vcom through T9 and outputs the common voltage of Vcom. In addition, in the t5 stage, other input signals are all at the low voltage level, so that other transistors are all switched off in this stage.

It should be noted that description is given in the above embodiment by taking the case that the display period includes five stages t1, t2, t3, t4 and t5 as an example, but the display period may also include more stages in the actual operation of the touch driving unit, which is determined by the ratio of the length of the display period to the length of each stage. But in subsequent stages, the working principle of the 4n+1 stage is the same with that of the t1 or t5 stage; the working principle of the 4n+2 stage is the same with that of the t2 stage; the working principle of the 4n+3 stage is the same with that of the t3 stage; and the working principle of the 4n stage is the same with that of the t4 stage, in which n is a positive integer.

As known from the working principle of the driving unit, in the display period, Output1 of the touch driving unit does not provide any output but Output2 outputs the common voltage of Vcom.

In the t6 stage, both CLK4 and Input1 are at the high voltage level; T3, T4 and T10 are switched on; the node a is connected with V2 through T3, and the voltage of the node a is pulled down to the low voltage level; T5 and T7 are switched off; the node b is connected with V1 through T4, and the voltage of the node b is at the high voltage level; C2 stores the voltage of the node b; T6 is switched on; moreover, as CLK3 is at the low voltage level, Output1 is still at the low voltage level in this stage; Output2 is connected with Vcom through T10; and Output2 still outputs the common voltage of Vcom in this stage. In addition, in the t5 stage, other input signals are all at the low voltage level, so that other transistors are all switched off in this stage.

In the t7 stage, Input1 is at the low voltage level in this stage; T4 is switched off; the node b may still maintain the high voltage level through C2; T6 is switched on; moreover, as CLK3 is at the high voltage level in this stage, Output1 outputs the high voltage level of CLK3, and meanwhile, T8 is switched on; TX_in is connected with Output2 through T8; and Output2 outputs the driving signal of TX_in.

In the t8 stage, CLK2 is at the high voltage level; T2 is switched on; V1 charges the node a through T2; the voltage of the node a is at the high voltage level; C1 stores the high level voltage of the node a; T5, T7 and T9 are switched on; the node b is connected with V2 through T5, and the voltage of the node b is at the low voltage level; Output1 is connected with V2 through T7, and the voltage of Output1 is at the low voltage level; and Output2 is connected with Vcom through T9 and outputs the common voltage of Vcom. In addition, in the t8 stage, other input signals are all at the low voltage level, so that other transistors are all switched off in this stage.

It should be noted that description is given in the above embodiment by taking the case that the touch period includes the three stages t6, t7 and t8 as an example, but the touch period may also include more stages in the actual operation of the touch driving unit, which is determined by the ratio of the length of the touch period to the length of each stage. But in the subsequent stages, Output1 maintains the low voltage level and Output2 keeps outputting the voltage of Vcom until Input1 inputs the high voltage level again.

Moreover, all the transistors in the touch driving unit provided by the above embodiment may alternatively be P-type transistors which are switched on when the gate electrodes are at the low voltage level. If all the transistors are P-type transistors, only the timing sequence status of the various input signals in the touch driving unit are needed to be readjusted. For instance: the first voltage-level terminal V1 is adjusted to provide the low voltage level, and other signals are also adjusted to be sequence signals with opposite phases.

Figure 5:
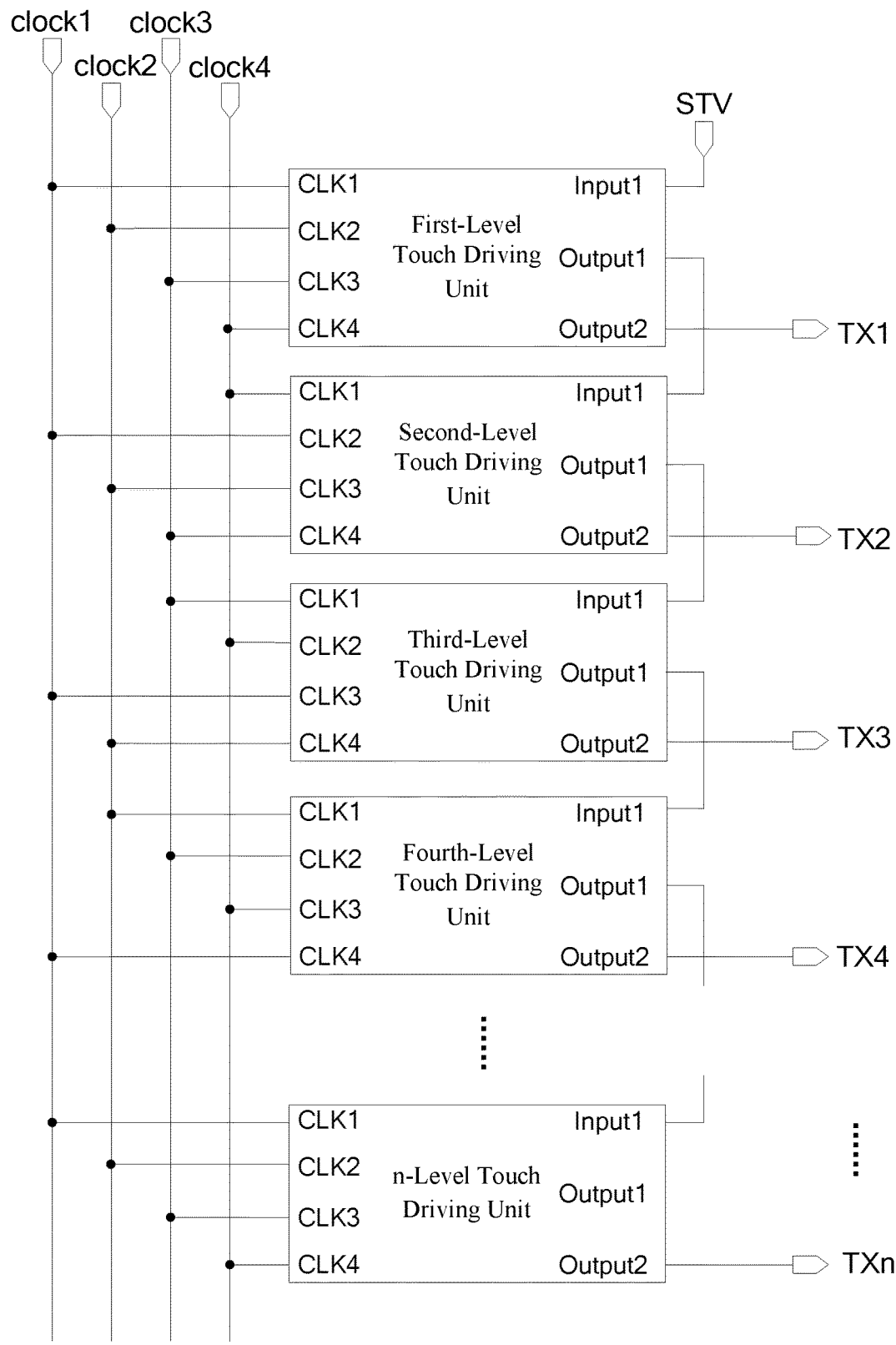
FIG. 5 is a schematic structural view of a touch driving circuit provided by an embodiment of the present disclosure.

As illustrated in FIG. 5, another embodiment of the present disclosure provides a touch driving circuit. The touch driving circuit comprises at least two cascaded touch driving units provided by the first embodiment.

A first input terminal Input1 of a first-level touch driving unit is connected with a frame start signal terminal STV; a first output terminal Output1 of the first-level touch driving unit is connected with a first input terminal Input1 of a second-level touch driving unit; the first input terminal Input1 of the second-level touch driving unit is connected with the first output terminal Output1 of the first-level touch driving unit; a first output terminal Output1 of the second-level touch driving unit is connected with a first input terminal Input1 of a third-level touch driving unit; by analogy, a first input terminal Input1 of an n-level touch driving unit is connected with a first output terminal Output1 of an n−1-level touch driving unit; and a first output terminal Output1 of the n-level touch driving unit is connected with a first input terminal Input1 of an n+1-level touch driving unit, in which n is an integer greater than 1.

For instance, as illustrated in FIG. 5, the touch driving circuit comprises a plurality of cascaded touch driving units, where a first input terminal Input1 of a first-level touch driving unit is connected with a frame start signal terminal STV; a first output terminal Output1 of the first-level touch driving unit is connected with a first input terminal Input1 of a second-level touch driving unit; a second output terminal Output2 of the first-level touch driving unit is connected with a driving signal line Tx1; the first input terminal of the second-level touch driving unit is connected with the second output terminal Output2 of the first-level touch driving unit; a first output terminal of the second-level touch driving unit is connected with a first input terminal Input1 of a third-level touch driving unit; and a second output terminal Output2 of the second-level touch driving unit is connected with a driving signal line TX2. Other touch driving units of the touch driving circuit are connected according to the mode of the second-level touch driving unit.

Each touch driving unit includes one first clock signal terminal CLK1, one second clock signal terminal CLK2, one third clock signal terminal CLK3 and one fourth clock signal terminal CLK4. As illustrated in FIG. 5, clock signals are applied to four clock signal terminals connected with each touch driving unit through four system clock signals clock1, clock2, clock3 and clock4, in which: clock1 is inputted into CLK1 of the first-level touch driving unit; clock2 is inputted into CLK2 of the first-level touch driving unit; clock3 is inputted into CLK3 of the first-level touch driving unit; clock4 is inputted into CLK4 of the first-level touch driving unit. Clock4 is inputted into CLK1 of the second-level touch driving unit; clock1 is inputted into CLK2 of the second-level touch driving unit; clock2 is inputted into CLK3 of the second-level touch driving unit; clock3 is inputted into CLK4 of the second-level touch driving unit. Clock3 is inputted into CLK1 of the third-level touch driving unit; clock4 is inputted into CLK2 of the third-level touch driving unit; clock1 is inputted into CLK3 of the third-level touch driving unit; clock2 is inputted into CLK4 of the third-level touch driving unit. Clock2 is inputted into CLK1 of the fourth-level touch driving unit; clock3 is inputted into CLK2 of the fourth-level touch driving unit; clock4 is inputted into CLK3 of the fourth-level touch driving unit; and clock1 is inputted into CLK4 of the fourth-level touch driving unit. As for the n-level touch driving unit, when n=4x+1, clock signals which are the same as those inputted into the clock signal terminals of the first-level touch driving unit are inputted to clock signal terminals of the n-level touch driving unit; when n=4x+2, clock signals that are the same as those inputted into the clock signal terminals of the second-level touch driving unit are inputted into the clock signal terminals of the n-level touch driving unit; when n=4x+3, clock signals that are the same as those inputted into the clock signal terminals of the third-level touch driving unit are inputted into the clock signal terminals of the n-level touch driving unit; and when n=4x, clock signals that are the same as those inputted into the clock signal terminals of the fourth-level touch driving unit are inputted into the clock signal terminals of the n-level touch driving unit, in which x is a positive integer. Description is given in FIG. 5 by taking n=4x as an example.

For instance, the timing sequence status of system clocks may be referred to the first clock signal of the first clock signal terminal CLK1, the second clock signal of the second clock signal terminal CLK2, the third clock signal of the third clock signal terminal CLK3 and the fourth clock signal of the fourth clock signal terminal CLK4 in FIG. 4, in which the duty ratio of clock1, clock2, clock3 and clock4 is all 25% and has the difference of one quarter clock cycle in turn.

The touch driving circuit provided by the embodiment of the present disclosure is integrated on the array substrate of the in-cell touch display panel, connected with the touch electrodes, and configured to provide the common voltage or the touch driving signals to the common electrodes. Thus, the touch driving unit provided by the embodiment of the present disclosure can provide the common voltage to the common electrodes in the display period and provide the touch driving signals to the common electrodes multiplexed as the touch electrodes in the touch period, so as to achieve the driving of the touch display panel. Moreover, the touch driving unit comprises at least two transistors, and the transistors are all N-type or P-type. Therefore, the embodiment of the present disclosure can reduce the difficulty in the manufacturing process of the integrated touch driving unit and hence reduce the production cost of the touch display panel.

Second Embodiment

Figure 6:
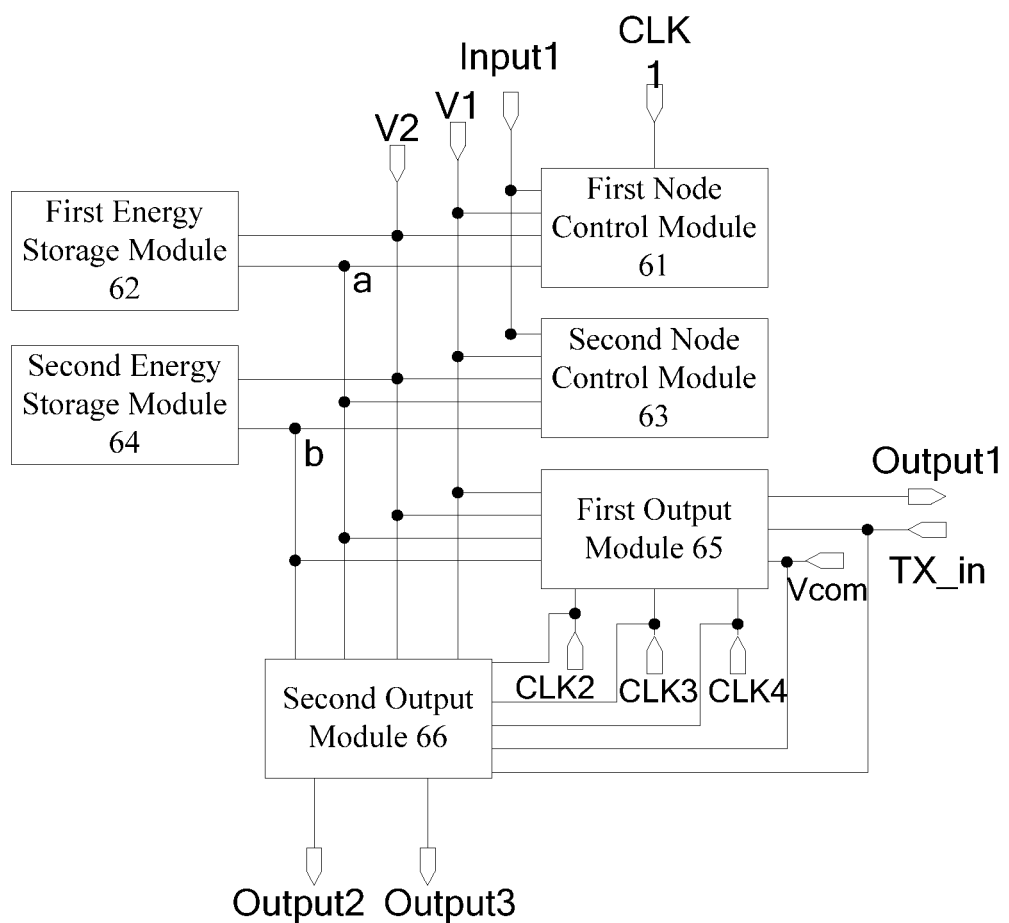
FIG. 6 is a schematic structural view of a touch driving unit provided by another embodiment of the present disclosure.

As illustrated in FIG. 6, a touch driving unit comprises: a first node control module 61, a first energy storage module 62, a second node control module 63, a second energy storage module 64, a first output module 65 and a second output module 66.

The first node control module 61 is connected with a first voltage-level terminal V1, a second voltage-level terminal V2, a first input terminal Input1, a first clock signal terminal CLK1 and a first node a. The first node control module 61 is configured to pull the voltage of the first node a to be equal to the voltage of the first voltage-level terminal V1 or the voltage of the second voltage-level terminal V2 under the control of a first clock signal inputted by the first clock signal terminal CLK1 and a first input signal inputted by the first input terminal Input1.

The first energy storage module 62 is connected with the first node a and the second voltage-level terminal V2 and configured to store the voltage of the first node a.

The second node control module 63 is connected with the first voltage-level terminal V1, the second voltage-level terminal V2, the first input terminal Input1, the first node a and a second node b. The second node control module 63 is configured to pull the voltage of the second node b to be equal to the voltage of the first voltage-level terminal V1 or the second voltage-level terminal V2 under the control of the first input signal inputted by the first input terminal Input1 and the voltage of the first node a.

The second energy storage module 64 is connected with the second node b and the second voltage-level terminal V2 and configured to store the voltage of the second node b.

The first output module 65 is connected with the first voltage-level terminal V1, the second voltage-level terminal V2, the first node a, the second node b, a second clock signal terminal CLK2, a third clock signal terminal CLK3, a fourth clock signal terminal CLK4, a driving signal input terminal TX_in, a common voltage input terminal Vcom and a first output terminal Output1. The first output module 65 is configured to output, at the first output terminal Output1, a driving signal inputted by the driving signal input terminal TX_in or the common voltage inputted by the common voltage input terminal, under the control of the voltage of the first node a, the voltage of the second node b, a second clock signal inputted by the second clock signal terminal CLK2, a third clock signal inputted by the third clock signal terminal CLK3 and a fourth clock signal inputted by the fourth clock signal terminal CLK4.

The second output module 66 is connected with the first voltage-level terminal V1, the second voltage-level terminal V2, the first node a, the second node b, the second clock signal terminal CLK2, the third clock signal terminal CLK3, the fourth clock signal terminal CLK4, the driving signal input terminal TX_in, the common voltage input terminal Vcom, a second output terminal Output2 and a third output terminal Output3. The second output module 66 is configured to: output, at the second output terminal Output2, the third clock signal of the third clock signal terminal CLK3 or pull the voltage of the second output terminal Output2 to be equal to the voltage of the second voltage-level terminal V2, under the control of the voltage of the first node a and the voltage of the second node b; and output, at the third output terminal Output3, the driving signal inputted by the driving signal input terminal TX_in or the common voltage inputted by the common voltage input terminal Vcom, under the control of the voltage of the first node, the voltage of the second node, the second clock signal of the second clock signal terminal CLK2, the third clock signal of the third clock signal terminal CLK3 and the fourth clock signal of the fourth clock signal terminal CLK4.

The touch driving unit provided by the embodiment of the present disclosure comprises one first node control module, one second node control module and two output modules; that is, the outputs of the two output modules can be controlled by one first node control module and one second node control module. Compared with the touch driving unit provided by the first embodiment, the embodiment of the present disclosure can further simplify the touch driving circuit.

Figure 7:
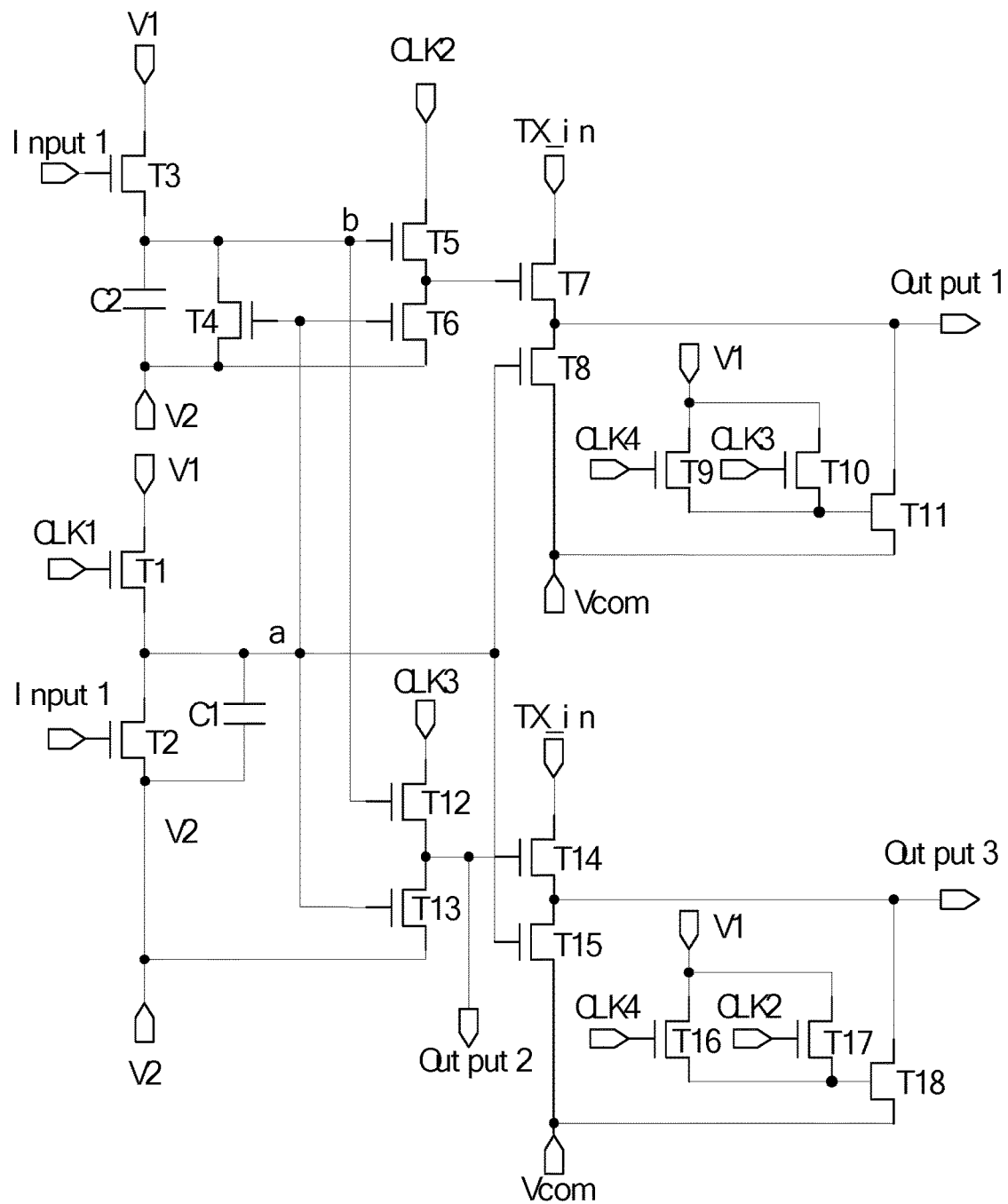
FIG. 7 is a circuit diagram of a touch driving unit provided by another embodiment of the present disclosure.

For instance, as illustrated in FIG. 7, the first node control module 61 includes: a first transistor T1 and a second transistor T2.

A first terminal of the first transistor T1 is connected with the first voltage-level terminal V1; a second terminal of the first transistor T1 is connected with the first node a; and a gate electrode of the first transistor T1 is connected with the first clock signal terminal CLK1.

A first terminal of the second transistor T2 is connected with the first node a; a second terminal of the second transistor T2 is connected with the second voltage-level terminal V2; and a gate electrode of the second transistor T2 is connected with the first input terminal Input1.

The first energy storage module 62 includes: a first capacitor C1.

A first end of the first capacitor C1 is connected with the first node a, and a second end of the first capacitor C1 is connected with the second voltage-level terminal V2.

The second node control module 62 includes: a third transistor T3 and a fourth transistor T4.

A first terminal of the third transistor T3 is connected with the first voltage-level terminal V1; a second terminal of the third transistor T3 is connected with the second node b; and a gate electrode of the third transistor T3 is connected with the first input terminal Input1.

A first terminal of the fourth transistor T4 is connected with the second node b; a second terminal of the fourth transistor T4 is connected with the second voltage-level terminal V2; and a gate electrode of the fourth transistor T4 is connected with the first node a.

The second energy storage module 64 includes: a second capacitor C2.

A first end of the second capacitor C2 is connected with the second node b, and a second end of the second capacitor C2 is connected with the second voltage-level terminal V2.

The first output module 65 includes: a fifth transistor T5, a sixth transistor T6, a seventh transistor T7, an eighth transistor T8, a ninth transistor T9, a tenth transistor T10 and an eleventh transistor T11.

A first terminal of the fifth transistor T5 is connected with the second clock signal terminal CLK2; a second terminal of the fifth transistor T5 is connected with a first terminal of the sixth transistor T6; and a gate electrode of the fifth transistor T5 is connected with the second node b.

The first terminal of the sixth transistor T6 is connected with a gate electrode of the seventh transistor T7; a second terminal of the sixth transistor T6 is connected with the second voltage-level terminal V2; and a gate electrode of the sixth transistor T6 is connected with the first node a.

A first terminal of the seventh transistor T7 is connected with the driving signal input terminal TX_in and a second terminal of the seventh transistor T7 is connected with the first output terminal Output1.

A first terminal of the eighth transistor T8 is connected with the first output terminal Output1; a second terminal of the eighth transistor T8 is connected with the common voltage input terminal Vcom; and a gate electrode of the eighth transistor T8 is connected with the first node a.

A first terminal of the ninth transistor T9 is connected with the first voltage-level terminal V1; a second terminal of the ninth transistor T9 is connected with a gate electrode of the eleventh transistor T11; and a gate electrode of the ninth transistor T9 is connected with the fourth clock signal terminal CLK4.

A first terminal of the tenth transistor T10 is connected with the first voltage-level terminal V1; a second terminal of the tenth transistor T10 is connected with the gate electrode of the eleventh transistor T11; and a gate electrode of the tenth transistor T10 is connected with the third clock signal terminal CLK3.

A first terminal of the eleventh transistor T11 is connected with the first output terminal Output1, and a second terminal of the eleventh transistor T11 is connected with the common voltage input terminal Vcom.

The second output module 66 includes: a twelfth transistor T12, a thirteenth transistor T13, a fourteenth transistor T14, a fifteenth transistor T15, a sixteenth transistor T16, a seventeenth transistor T17 and an eighteenth transistor T18.

A first terminal of the twelfth transistor T12 is connected with the third clock signal terminal CLK3; a second terminal of the twelfth transistor T12 is connected with the second output terminal Output2; and a gate electrode of the twelfth transistor T12 is connected with the second node b.

A first terminal of the thirteenth transistor T13 is connected with the second output terminal Output2; a second terminal of the thirteenth transistor T13 is connected with the second voltage-level terminal V2; and a gate electrode of the thirteenth transistor T13 is connected with the first node a.

A first terminal of the fourteenth transistor T14 is connected with the driving signal input terminal TX_in; a second terminal of the fourteenth transistor T14 is connected with the third output terminal Output3; and a gate electrode of the fourteenth transistor T14 is connected with the second output terminal Output2.

A first terminal of the fifteenth transistor T15 is connected with the third output terminal Output3; a second terminal of the fifteenth transistor T15 is connected with the common voltage input terminal Vcom; and a gate electrode of the fifteenth transistor T15 is connected with the first node a.

A first terminal of the sixteenth transistor T16 is connected with the first voltage-level terminal V1; a second terminal of the sixteenth transistor T16 is connected with a gate electrode of the eighteenth transistor T18; and a gate electrode of the sixteenth transistor T16 is connected with the fourth clock signal terminal CLK4.

A first terminal of the seventeenth transistor T17 is connected with the first voltage-level terminal V1; a second terminal of the seventeenth transistor T17 is connected with the gate electrode of the eighteenth transistor T18; and a gate electrode of the seventeenth transistor T17 is connected with the second clock signal terminal CLK2.

A first terminal of the eighteenth transistor T18 is connected with the third output terminal Output3, and a second terminal of the eighteenth transistor T18 is connected with the common voltage input terminal Vcom.

Another embodiment of the present disclosure provides a driving method for driving the touch driving unit provided by the second embodiment. The method comprises:

in a first stage of a display period, pulling the voltage of the first node to be equal to the voltage of the first voltage-level terminal through the first node control module under the control of the first clock signal of the first clock signal terminal; storing, by the first energy storage module, the voltage of the first node; outputting, at the first output terminal, the common voltage inputted by the common voltage input terminal through the first output module under the control of the voltage of the first node; and pulling the voltage of the second output terminal to be equal to the voltage of the second voltage-level terminal, and outputting, at the third output terminal, the common voltage inputted by the common voltage input terminal, through the second output module under the control of the voltage of the first node;

in a second stage of the display period, outputting, at the first output terminal, the common voltage inputted by the common voltage input terminal through the first output module under the control of the fourth clock signal inputted by the fourth clock signal terminal; and pulling the voltage of the second output terminal to be equal to the voltage of the second voltage-level terminal through the second output module under the control of the voltage of the first node, and outputting, at the third output terminal, the common voltage inputted by the common voltage input terminal through the second output module under the control of the fourth clock signal inputted by the fourth clock signal terminal;

in a third stage of the display period, outputting, at the first output terminal, the common voltage inputted by the common voltage input terminal through the first output module under the control of the voltage of the first node; and pulling the voltage of the second output terminal to be equal to the voltage of the second voltage-level terminal through the second output module under the control of the voltage of the first node, and outputting, at the third output terminal, the common voltage inputted by the common voltage input terminal through the second output module under the control of the second clock signal inputted by the second clock signal terminal;

in a fourth stage of the display period, outputting, at the first output terminal, the common voltage inputted by the common voltage input terminal through the first output module under the control of the third clock signal inputted by the third clock signal terminal; and pulling the voltage of the second output terminal to be equal to the voltage of the second voltage-level terminal through the second output module under the control of the voltage of the first node, and outputting, at the third output terminal, the common voltage inputted by the common voltage input terminal through the second output module under the control of the second clock signal inputted by the second clock signal terminal;

in a first stage of a touch period, pulling the voltage of the first node to be equal to the voltage of the second voltage-level terminal through the first node control module under the control of the first input signal inputted by the first input terminal; pulling the voltage of the second node to be equal to the voltage of the first voltage-level terminal through the second node control module under the control of the voltage of the first node and the first input signal inputted by the first input terminal; outputting, at the first output terminal, the common voltage inputted by the common voltage input terminal through the first output module under the control of the fourth clock signal inputted by the fourth clock signal terminal; and outputting, at the third output terminal, the common voltage inputted by the common voltage input terminal through the second output module under the control of the fourth clock signal of the fourth clock signal terminal;

in a second stage of the touch period, outputting, at the first output terminal, the driving signal inputted by the driving signal input terminal through the first output module under the control of the voltage of the second node and the second clock signal inputted by the second clock signal terminal; and outputting, at the third output terminal, the common voltage inputted by the common voltage input terminal through the second output terminal under the control of the second clock signal inputted by the second clock signal terminal;

in a third stage of the touch period, outputting, at the first output terminal, the common voltage inputted by the common voltage input terminal through the first output module under the control of the third clock signal of the third clock signal terminal; and outputting, at the second output terminal, the third clock signal of the third clock signal terminal through the second output module under the control of the voltage of the second node, and outputting, at the third output terminal, the driving signal inputted by the driving signal input terminal through the second output module under the control of the third clock signal inputted by the third clock signal terminal.

Figure 8:
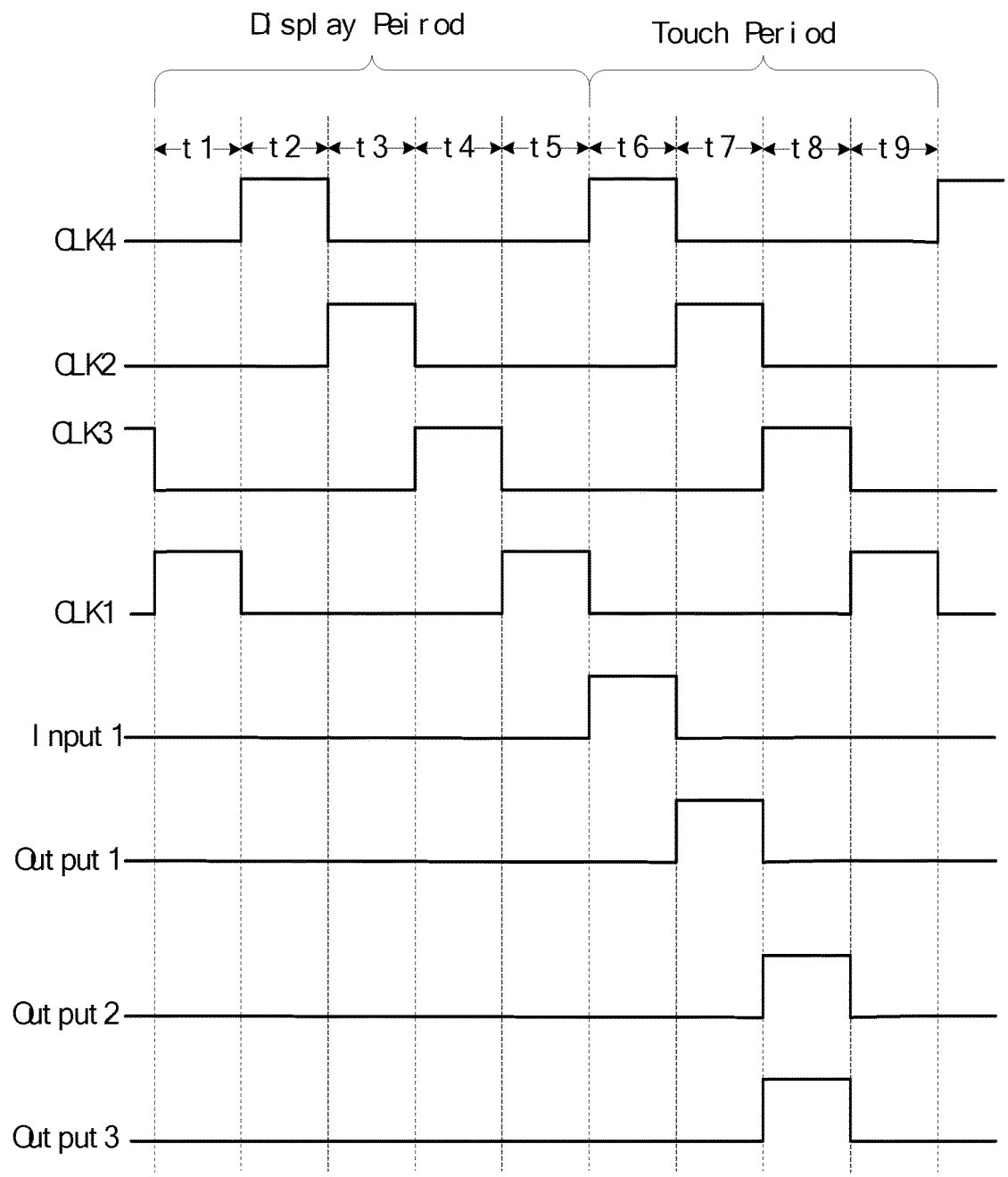
FIG. 8 is a schematic diagram illustrating a timing sequence status of signals in the touch driving unit as shown in FIG. 5 provided by an embodiment of the present disclosure.

Description will be given below to the working principle of the touch driving unit as shown in FIG. 7 with reference to the schematic timing sequence status diagram as shown in FIG. 8. Description is given by taking the case that the transistors in the touch driving unit as shown in FIG. 7 are all N-type transistors which are switched on when the gate electrodes are at the high voltage level, as an example. FIG. 8 illustrates the timing sequence status of the first clock signal terminal CLK1, the second clock signal terminal CLK2, the third clock signal terminal CLK3, the fourth clock signal terminal CLK4, the first input terminal Input1, the first output terminal Output1, the second output terminal Output2 and the third output terminal Output3. In addition, in the embodiment, the first voltage-level terminal V1 provides a high level voltage; the second voltage-level terminal V2 provides a low level voltage; the driving signal input terminal TX_in provides a touch driving signal; and the common voltage terminal Vcom provides a common voltage. Illustratively, the second voltage-level terminal V2 may be a ground terminal. As illustrated in FIG. 8, description is given to the working principle of the touch driving unit in the display period and the touch period respectively, in which for example the display period includes: a first stage t1, a second stage t2, a third stage t3, a fourth stage t4 and a fifth stage t5; and the touch period includes: a sixth stage t6, a seventh stage t7, an eighth stage t8 and a ninth stage t9.

In the t1 stage, CLK1 is at the high voltage level; T1 is switched on; V1 charges the node a through T1; the voltage of the node a is at the high voltage level; C1 stores the high level voltage of the node a; T4, T6, T8, T13 and T15 are switched on; the node b is connected with V2 through T4, and the voltage of the node b is at the low voltage level; Output1 is connected with Vcom through T8 and outputs the common voltage of the common voltage input terminal Vcom; Output2 is connected with V2 through T13 and is at the low voltage level; and Output3 is connected with Vcom through T15 and outputs the common voltage of the common voltage input terminal Vcom. In addition, in the t1 stage, other input signals are all at the low voltage level, so that other transistors are all switched off in this stage.

In the t2 stage, CLK4 is at the high voltage level; as both CLK1 and Input1 are at the low voltage level in this stage, T1 and T2 are switched off; the node a may maintain the high voltage level through C1; T4, T6, T8, T13 and T16 are switched on; the node b is connected with V2 through T4, and the voltage of the node b is at the low voltage level; moreover, as CLK4 is at the high voltage level, T9 and 116 are switched on; V1 is connected with the gate electrode of T11 through T9; T11 is switched on; V1 is connected with the gate electrode of T18 through T16, and T18 is switched on; Output1 is connected with Vcom through T8 and T11 and outputs the common voltage of the common voltage input terminal Vcom; Output2 is connected with V2 through T13 and is at the low voltage level; and Output3 is connected with Vcom through T15 and T18 and outputs the common voltage of the common voltage input terminal Vcom. In addition, in the t2 stage, other input signals are all at the low voltage level, so that other transistors are all switched off in this stage.

In the t3 stage, CLK2 is at the high voltage level; as CLK1 and Input1 are still at the low voltage level in this stage, T1 and T2 are switched off; the node a may maintain the high voltage level through C1; T4, T6, T8, T13 and T16 are switched on; the node b is connected with V2 through T4, and the voltage of the node b is at the low voltage level; Output1 is connected with Vcom through T8 and outputs the common voltage of the common voltage input terminal Vcom; Output2 is connected with V2 through T13 and is at the low voltage level. As the node b is at the low voltage level, T5 is switched off; as the high voltage level of CLK2 cannot reach the gate electrode of T1, T1 still maintains the off state. CLK2 is at the high voltage level; T17 is switched on; V1 is connected with the gate electrode of T18 through T17; T18 is switched on; and Output3 is connected with Vcom through T15 and T18 and outputs the common voltage of the common voltage input terminal Vcom. In addition, in the t3 stage, other input signals are all at the low voltage level, so that other transistors are all switched off in this stage.

In the t4 stage, CLK3 is at the high voltage level; as CLK1 and Input1 are still at the low voltage level in this stage, T1 and T2 are switched off; the node a may maintain the high voltage level through C1; T4, T6, T8, T13 and T16 are switched on; the node b is connected with V2 through T4, and the voltage of the node b is at the low voltage level; CLK3 is at the high voltage level; T10 is switched on; V1 is connected with the gate electrode of T11 through T10; T11 is switched on; Output1 is connected with Vcom through T8 and T11 and outputs the common voltage of the common voltage input terminal Vcom; as the node b is at the low voltage level, T12 is switched off; as the high voltage level of CLK3 cannot reach the gate electrode of T14, T14 still maintains the off state. Outpu2 is connected with V2 through T13 and is at the low voltage level. As the node b is at the low voltage level, T12 is switched off; as the high voltage level of CLK3 cannot reach the gate electrode of T14, T14 still maintains the off state. Output3 is connected with Vcom through T15 and outputs the common voltage of Vcom. In addition, in the t4 stage, other input signals are all at the low voltage level, so that other transistors are all switched off in this stage.

In the t5 stage, CLK1 is at the high voltage level. The working principle of this stage is similar to that of the t1 stage and reference may be made to the working principle of the t1 stage. No further description will be given here.

It should be noted that description is given in the above embodiment by taking the case that the display period includes five stages t1, t2, t3, t4 and t5 as an example, but the display period may also include more stages in the actual operation of the touch driving unit, which is determined by the ratio of the length of the display period to the length of each stage. But in subsequent stages, the working principle of the 4n+1 stage is the same as that of the t1 or t5 stage; the working principle of the 4n+2 stage is the same as that of the t2 stage; the working principle of the 4n+3 stage is the same as that of the t3 stage; and the working principle of the 4n stage is the same as that of the t4 stage, in which n is a positive integer.

As known from the working principle of the above driving circuit, in the display period, Output2 of the touch driving unit does not provide output and both Output1 and Output3 output the common voltage of Vcom.

In the t6 stage, both CLK4 and Input1 are at the high voltage level; as Input1 is at the high voltage level, T2 and T3 are switched on; the node a is connected with V2 through T2, and the voltage of the node a is pulled down to the low voltage level; T4, T6, T8, T13 and T16 are switched off; the node b is connected with V1 through T3, and the voltage of the node b is at the high voltage level; C2 stores the voltage of the node b; T5 and T12 are switched on; but as both CLK2 and CLK3 are at the low voltage level, both T1 and T5 are switched off; moreover, as CLK4 is at the high voltage level, T9 and T16 are switched on; V1 is respectively connected with the gate electrodes of TI 1 and T18 through T9 and T16; T11 and T18 are switched on; Output1 is connected with Vcom through T11 and outputs the common voltage of Vcom; Output3 is connected with Vcom through T18 and outputs the common voltage of Vcom; and Output2 is still at the low voltage level. In addition, in the t6 stage, other input signals are all at the low voltage level, so that other transistors are all switched off in this stage.

In the t7 stage, CLK2 is at the high voltage level; Input1 is at the low voltage level in this stage; T2 and T3 are switched off; the node b may still maintain the high voltage level through C2; T5 and T12 are switched on; moreover, as CLK2 is at the high voltage level in this stage, T7 is switched on; TX_in is connected with Output1 through T7; Output1 outputs the driving signal of TX_in. As CLK3 is at the low voltage level, Output2 maintains the low voltage level; CLK2 is at the high voltage level; T17 is switched on; V1 is connected with the gate electrode of T18 through T17; T18 is switched on; and Output3 is connected with Vcom through T18 and outputs the common voltage of Vcom.

In the t8 stage, CLK3 is at the high voltage level; Input1 is at the low voltage level in this stage; T2 and T3 are switched off; the node b may still maintain the high voltage level through C2; T5 and T12 are switched on; moreover, as CLK3 is at the high voltage level in this stage, T10 is switched on; Vcom is connected with Output1 through T7; Output1 outputs the common voltage of Vcom; as CLK3 is at the high voltage level, Output2 outputs the high level of CLK3, and meanwhile, T14 is switched on; TX_in is connected with Output3 through T14; and Output3 outputs the driving signal of TX_in.

In the t9 stage, CLK1 is at the high voltage level. The working principle of this stage is similar to that of the t1 stage and reference may be made to the working principle of the t1 stage. No further description will be given here.

It should be noted that description is given in the above embodiment by taking the case that the touch period includes the four stages t6, t7, t8 and t9 as an example, but the touch period may also include more stages in the actual operation of the touch driving unit, which is determined by the ratio of the length of the touch period to the length of each stage. But in the subsequent stages, Output2 maintains the low voltage level and Output1 and Output3 keeps outputting the voltage of Vcom until Input1 inputs the high voltage level again.

Moreover, all the transistors in the touch driving unit provided by the above embodiment may alternatively be P-type transistors which are switched on when the gate electrodes are at the low voltage level. If all the transistors are P-type transistors, only the timing sequence status of various input signals in a reverser is needed to readjusted. For instance: the first voltage-level terminal V1 is adjusted to provide the low voltage level, and other signals are also adjusted to be sequence signals with opposite phases.

Figure 9:
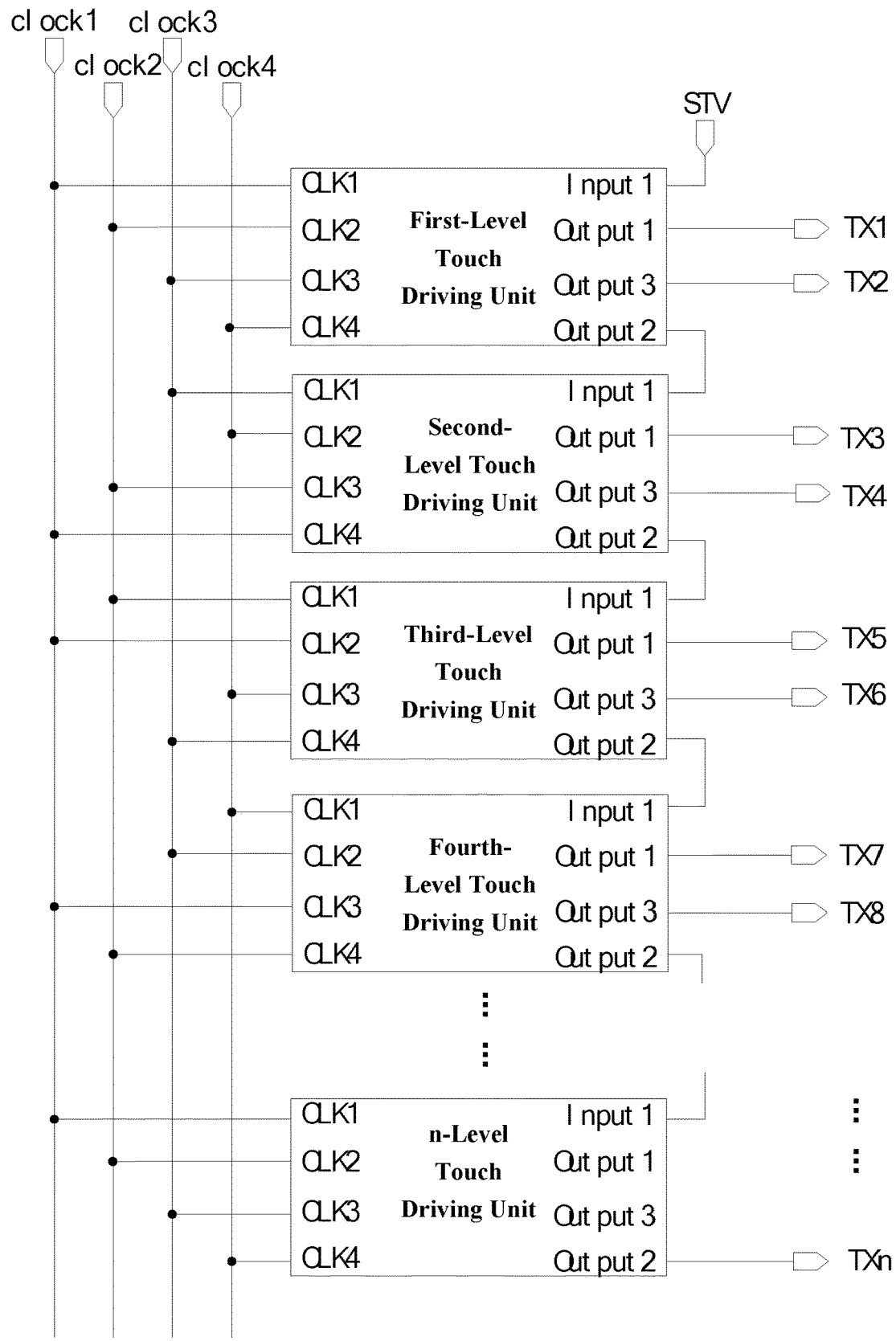
FIG. 9 is a schematic structural view of a touch driving circuit provided by another embodiment of the present disclosure.

As illustrated in FIG. 9, still another embodiment of the present disclosure provides a touch driving circuit. The touch driving circuit comprises at least two cascaded touch driving units provided by the second embodiment.

A first input terminal of a first-level touch driving unit is connected with a frame start signal terminal STV; a second output terminal Output2 of the first-level touch driving unit is connected with a first input terminal Input1 of a second-level touch driving unit; the first input terminal of the second-level touch driving unit is connected with the second output terminal Output2 of the first-level touch driving unit; a second output terminal Output2 of the second-level touch driving is connected with a first input terminal Input1 of a third-level touch driving unit; and touch driving units in other following levels can be cascaded similarly.

A first input terminal Input1 of an n-level touch driving unit is connected with a second output terminal Output2 of an n–1-level touch driving unit, and a second output terminal Output2 of the n-level touch driving unit is connected with a first input terminal Input1 of an n+1-level touch driving unit; where is an integer greater than 1.

For instance, as illustrated in FIG. 9, the touch driving circuit comprises a plurality of cascaded touch driving units, where a first input terminal Input1 of a first-level touch driving unit is connected with a frame start signal terminal STV; a first output terminal Output1 of the first-level touch driving unit is connected with a touch signal line TX1; a second output terminal Output2 of the first-level touch driving unit is connected with a first input terminal Input1 of a second-level touch driving unit; a third output terminal Output3 of the first-level touch driving unit is connected with a driving signal line TX2; the first input terminal of the second-level touch driving unit is connected with the second output terminal Output2 of the first-level touch driving unit; a first output terminal of the second-level touch driving unit is connected with a touch driving signal line TX3; a second output terminal Output2 of the second-level touch driving unit is connected with a first input terminal Input1 of a third-level touch driving unit; and a third output terminal Output3 of the second-level touch driving unit is connected with a touch driving signal line TX4. Other touch driving units of the touch driving circuit are connected according to the approach of the second-level touch driving unit.

Each touch driving unit includes one first clock signal terminal CLK1, one second clock signal terminal CLK2, one third clock signal terminal CLK3 and one fourth clock signal terminal CLK4. As illustrated in FIG. 7, clock signals are applied to four clock signal terminals connected with each touch driving unit through four system clock signals clock1, clock2, clock3 and clock4, in which: clock1 is inputted into CLK1 of the first-level touch driving unit; clock2 is inputted into CLK2 of the first-level touch driving unit; clock3 is inputted into CLK3 of the first-level touch driving unit; clock4 is inputted into CLK4 of the first-level touch driving unit. Clock3 is inputted into CLK1 of the second-level touch driving unit; clock4 is inputted into CLK2 of the second-level touch driving unit; clock2 is inputted into CLK3 of the second-level touch driving unit; clock1 is inputted into CLK4 of the second-level touch driving unit. Clock2 is inputted into CLK1 of the third-level touch driving unit; clock1 is inputted into CLK2 of the third-level touch driving unit; clock4 is inputted into CLK3 of the third-level touch driving unit; clock3 is inputted into CLK4 of the third-level touch driving unit. Clock4 is inputted into CLK1 of the fourth-level touch driving unit; clock3 is inputted into CLK2 of the fourth-level touch driving unit; clock1 is inputted into CLK3 of the fourth-level touch driving unit; and clock2 is inputted into CLK4 of the fourth-level touch driving unit. As for the n-level touch driving unit: when n=4x+1, clock signals that are the same as those inputted into the clock signal terminals of the first-level touch driving unit are inputted to clock signal terminals of the n-level touch driving unit; when n=4x+2, clock signals that are the same as those inputted into the clock signal terminals of the second-level touch driving unit are inputted into the clock signal terminals of the n-level touch driving unit; when n=4x+3, clock signals that are the same as those inputted into the clock signal terminals of the third-level touch driving unit are inputted into the clock signal terminals of the n-level touch driving unit; and when n=4x, clock signals that are the same as those inputted into the clock signal terminals of the fourth-level touch driving unit are inputted into the clock signal terminals of the n-level touch driving unit, in which x is a positive integer. Description is given in FIG. 9 by taking n=4x as an example.

For instance, the timing sequence status of a system clock may be referred to the fourth clock signal inputted by the fourth clock signal terminal CLK4, the second clock signal inputted by the second clock signal terminal CLK2, the third clock signal inputted by the third clock signal terminal CLK3 and the first clock signal inputted by the first clock signal terminal CLK1 in FIG. 7, in which the duty ratio of clock1, clock2, clock3 and clock4 is all 25% and has the difference of one quarter clock cycle in turn.

The touch driving circuit provided by the embodiment of the present disclosure is integrated on the array substrate of the in-cell touch display panel, connected with the touch electrodes, and configured to provide the common voltage or the touch driving signals to the common electrodes. Thus, the touch driving unit provided by the embodiment of the present disclosure can provide the common voltage to the common electrodes in the display period and provide the touch driving signals to the common electrodes multiplexed as the touch electrodes in the touch period, so as to achieve the driving of the touch display panel. Moreover, the touch driving unit comprises at least two transistors, and the transistors are all N-type or P-type. Therefore, the embodiment of the present disclosure can reduce the difficulty in the manufacturing process of the integrated touch driving unit and hence reduce the production cost of the touch display panel. Moreover, compared with the touch driving circuit provided by the first embodiment, one first node control module and one second node control module may be adopted to control the output of two output modules, so the number of the transistors, capacitors and wirings can be reduced, and hence the embodiment of the present disclosure can further simplify the touch driving circuit.

An embodiment of the present disclosure provides a display device, which comprises any foregoing touch driving circuit. In addition, the display device may be: any product or component with a display function such as e-paper, a mobile phone, a tablet PC, a TV, a display, a notebook computer, a digital picture frame and a navigator.

In the present disclosure, terms such as "first", "second" and the like used in the present disclosure do not indicate any sequence, quantity or significance but only for distinguishing different constituent parts. Also, the terms such as "a," "an," or "the" etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects.

Obviously, those skilled in the art may modify the disclosure in various ways without breaking away from the spirits and scope of the disclosure. And so, if these changes and variations of the disclosure also fall within the scope of the claims or their equivalent technologies, the disclosure intends to include these changes and variations.

What are described above is related to the illustrative embodiments of the disclosure only and not limitative to the scope of the disclosure; any changes or replacements easily for those technical personnel who are familiar with this technology in the field to envisage in the scopes of the disclosure, should be in the scope of protection of the present disclosure. Therefore, the scopes of the disclosure are defined by the accompanying claims.

The present application claims the priority of the Chinese Patent Application No. 201610005489.0 filed on Jan. 4, 2016, which is incorporated herein by reference in its entirety as part of the disclosure of the present application.

What is claimed is:

1. A touch driving unit for a touch display panel, comprising:
   at least two transistors of a same type, wherein:
   common electrodes of the touch display panel are multiplexed as touch electrodes; and
   the touch driving unit is integrated on an array substrate of the touch display panel and is connected with the common electrodes, the touch driving unit is disposed outside a gate driving circuit on the array substrate and the touch driving unit is configured to output common voltages or touch driving signals to the common electrodes, the touch driving unit comprises: a first node control module, a first energy storage module, a second node control module, a second energy storage module and an output module, wherein:
   the first node control module is connected with a first voltage-level terminal, a second voltage-level terminal, a first input terminal, a first clock signal terminal, a second clock signal terminal and a first node; the first node control module is configured to:
     pull a voltage of the first node to be equal to a voltage of the first voltage-level terminal or a voltage of the second voltage-level terminal under the control of a first clock signal inputted by the first clock signal terminal, a second clock signal inputted by the second clock signal terminal, and a first input signal inputted by the first input terminal;
   the first energy storage module is connected with the first node and the second voltage-level terminal and configured to store the voltage of the first node;
   the second node control module is connected with the first voltage-level terminal, the second voltage-level terminal, the first input terminal, the first node and a second node; the second node control module is configured to:

pull a voltage of the second node to be equal to the voltage of the first voltage-level terminal or the second voltage-level terminal under the control of the first input signal inputted by the first input terminal and the voltage of the first node;

the second energy storage module is connected with the second node and the second voltage-level terminal and configured to store the voltage of the second node;

the output module is connected with the second voltage-level terminal, the first node, the second node, a third clock signal terminal, a fourth clock signal terminal, a driving signal input terminal, a common voltage input terminal, a first output terminal and a second output terminal; and the output module is configured to:

output, at the first output terminal, a third clock signal of the third clock signal terminal or pull a voltage of the first output terminal to be equal to the voltage of the second voltage-level terminal, under the control of the voltage of the first node and the voltage of the second node; and output, at the second output terminal, a driving signal inputted by the driving signal input terminal or a common voltage inputted by the common voltage input terminal under the control of the voltage of the first node, the voltage of the second node, the third clock signal of the third clock signal terminal and a fourth clock signal of the fourth clock signal terminal.

2. The touch driving unit according to claim 1, wherein:
the first node control module includes: a first transistor, a second transistor and a third transistor;
a first terminal of the first transistor is connected with the first voltage-level terminal; a second terminal of the first transistor is connected with the first node; a gate electrode of the first transistor is connected with the first clock signal terminal;
a first terminal of the second transistor is connected with the first voltage-level terminal; a second terminal of the second transistor is connected with the first node; a gate electrode of the second transistor is connected with the second clock signal terminal; and
a first terminal of the third transistor is connected with the first node; a second terminal of the third transistor is connected with the second voltage-level terminal; and a gate electrode of the third transistor is connected with the first input terminal.

3. The touch driving unit according to claim 1, wherein:
the first energy storage module includes a first capacitor; and
a first end of the first capacitor is connected with the first node, and a second end of the first capacitor is connected with the second voltage-level terminal.

4. The touch driving unit according to claim 1, wherein:
the second node control module includes a fourth transistor and a fifth transistor;
a first terminal of the fourth transistor is connected with the first voltage-level terminal; a second terminal of the fourth transistor is connected with the second node; a gate electrode of the fourth transistor is connected with the first input terminal; and
a first terminal of the fifth transistor is connected with the second node; a second terminal of the fifth transistor is connected with the second voltage-level terminal; and a gate electrode of the fifth transistor is connected with the first node.

5. The touch driving unit according to claim 1, wherein:
the second energy storage module includes a second capacitor; and a first end of the second capacitor is connected with the second node, and a second end of the second capacitor is connected with the second voltage-level terminal.

6. The touch driving unit according to claim 1, wherein:
the output module includes a sixth transistor, a seventh transistor, an eighth transistor, a ninth transistor and a tenth transistor;
a first terminal of the sixth transistor is connected with the third clock signal terminal; a second terminal of the sixth transistor is connected with the first output terminal; a gate electrode of the sixth transistor is connected with the second node;
a first terminal of the seventh transistor is connected with the first output terminal; a second terminal of the seventh transistor is connected with the second voltage-level terminal; a gate electrode of the seventh transistor is connected with the first node;
a first terminal of the eighth transistor is connected with the driving signal input terminal; a second terminal of the eighth transistor is connected with the second output terminal; a gate electrode of the eighth transistor is connected with the first input terminal;
a first terminal of the ninth transistor is connected with the second output terminal; a second terminal of the ninth transistor is connected with the common voltage input terminal; a gate electrode of the ninth transistor is connected with the first node; and
a first terminal of the tenth transistor is connected with the second output terminal; a second terminal of the tenth transistor is connected with the common voltage input terminal; and a gate electrode of the tenth transistor is connected with the fourth clock signal terminal.

7. A touch driving circuit, comprising the touch driving unit according to claim 1.

8. The touch driving circuit according to claim 7, comprising at least two cascaded touch driving units, wherein:
a first input terminal of a first-level touch driving unit is connected with a frame start signal terminal; a first output terminal of the first-level touch driving unit is connected with a first input terminal of a second-level touch driving unit;
a first input terminal of an n-level touch driving unit is connected with a first output terminal of an n−1-level touch driving unit; and a first output terminal of the n-level touch driving unit is connected with a first input terminal of an n+1-level touch driving unit;
wherein n is an integer greater than 1.

9. The touch driving circuit according to claim 7, comprising at least two cascaded touch driving units, wherein:
a first input terminal of a first-level touch driving unit is connected with a frame start signal terminal; a second output terminal of the first-level touch driving unit is connected with a first input terminal of a second-level touch driving unit;
a first input terminal of an n-level touch driving unit is connected with a second output terminal of a n−1-level touch driving unit; and a second output terminal of the n-level touch driving unit is connected with a first input terminal of an n+1-level touch driving unit;
wherein n is an integer greater than 1.

10. A display device, comprising the touch driving circuit according to claim 7.

11. A driving method for driving the touch driving unit according to claim 1, comprising:
in a first stage of a display period: pulling the voltage of the first node to be equal to the voltage of the first voltage-level terminal through the first node control module under the control of the first clock signal inputted by the first clock signal terminal; storing, through the first energy storage module, the voltage of the first node; and, through the output module under the control of the voltage of the first node, pulling the voltage of the first output terminal to be equal to the voltage of the second voltage-level terminal, and outputting, at the second output terminal, the common voltage inputted by the common voltage input terminal;

in a second stage of the display period: pulling the voltage of the first output terminal to be equal to the voltage of the second voltage-level terminal through the output module under the control of the voltage of the first node; and outputting, at the second output terminal, the common voltage inputted by the common voltage input terminal through the output module under the control of the fourth clock signal inputted by the fourth clock signal terminal;

in a third stage of the display period: pulling the voltage of the first output terminal to be equal to the voltage of the second voltage-level terminal and outputting, at the second output terminal, the common voltage inputted by the common voltage input terminal through the output module under the control of the voltage of the first node;

in a fourth stage of the display period: pulling the voltage of the first node to be equal to the voltage of the first voltage-level terminal through the first node control module under the control of the second clock signal of the second clock signal terminal; storing, by the first energy storage module, the voltage of the first node; and outputting, at the second output terminal, the common voltage inputted by the common voltage input terminal through the output module under the control of the voltage of the first node;

in a first stage of a touch period: pulling the voltage of the first node to be equal to the voltage of the second voltage-level terminal through the first node control module under the control of the first input signal inputted by the first input terminal; pulling the voltage of the second node to be equal to the voltage of the first voltage-level terminal through the second node control module under the control of the first input signal inputted by the first input terminal and the voltage of the first node; storing, by the second energy storage module, the voltage of the second node; and outputting, at the second output terminal, the common voltage inputted by the common voltage input terminal through the output module under the control of the voltage of the fourth clock signal terminal; and in a second stage of the touch period: outputting, at the first output terminal, the third clock signal of the third clock signal terminal through the output module under the control of the voltage of the second node; and outputting, at the second output terminal, the driving signal inputted by the driving signal input terminal through the output module under the control of the third clock signal inputted by the third clock signal terminal.

12. A touch driving unit for a touch display panel, comprising:
at least two transistors of a same type, wherein:
common electrodes of the touch display panel are multiplexed as touch electrodes; and
the touch driving unit is integrated on an array substrate of the touch display panel and is connected with the common electrodes, the touch driving unit is disposed outside a gate driving circuit on the array substrate and the touch driving unit is configured to output common voltages or touch driving signals to the common electrodes, the touch driving unit comprises: a first node control module, a first energy storage module, a second node control module, a second energy storage module, a first output module and a second output module, wherein:

the first node control module is connected with a first voltage-level terminal, a second voltage-level terminal, a first input terminal, a first clock signal terminal and a first node; the first node control module is configured to:
 pull a voltage of the first node to be equal to a voltage of the second voltage-level terminal under the control of a first clock signal of the first clock signal terminal and a first input signal inputted by the first input terminal;

the first energy storage module is connected with the first node and the second voltage-level terminal and configured to store the voltage of the first node;

the second node control module is connected with the first voltage-level terminal, the second voltage-level terminal, the first input terminal, the first node and a second node; the second node control module is configured to:
 pull a voltage of the second node to be equal to the voltage of the first voltage-level terminal or the second voltage-level terminal under the control of the first input signal inputted by the first input terminal and the voltage of the first node;

the second energy storage module is connected with the second node and the second voltage-level terminal and configured to store the voltage of the second node;

the first output module is connected with the first voltage-level terminal, the second voltage-level terminal, the first node, the second node, a second clock signal terminal, a third clock signal terminal, a fourth clock signal terminal, a driving signal input terminal, a common voltage input terminal and a first output terminal; the first output module is configured to:
 output, at the first output terminal, a driving signal inputted by the driving signal input terminal or a common voltage inputted by the common voltage input terminal under the control of the voltage of the first node, the voltage of the second node, a second clock signal of the second clock signal terminal, a third clock signal of the third clock signal terminal, and a fourth clock signal of the fourth clock signal terminal; and the second output module is connected with the first voltage-level terminal, the second voltage-level terminal, the first node, the second node, the second clock signal terminal, the third clock signal terminal, the fourth clock signal terminal, the driving signal input terminal, the common voltage input terminal, a second output terminal and a third output terminal; and the second output module is configured to:
 output, at the second output terminal, the third clock signal of the third clock signal terminal or pull a voltage of the second output terminal to be equal to the voltage of the second voltage-level terminal, under the control of the voltage of the first node and the voltage of the second node; and
 output, at the third output terminal, the driving signal inputted by the driving signal input terminal or the common voltage inputted by the common voltage input terminal under the control of the voltage of the first node, the voltage of the second node, the second clock signal of the second clock signal terminal, the third clock signal of the third clock signal terminal and the fourth clock signal of the fourth clock signal terminal.

13. The touch driving unit according to claim 12, wherein the first node control module includes: a first transistor and a second transistor;

a first terminal of the first transistor is connected with the first voltage-level terminal; a second terminal of the first transistor is connected with the first node; a gate electrode of the first transistor is connected with the first clock signal terminal;

a first terminal of the second transistor is connected with the first node; a second terminal of the second transistor is connected with the second voltage-level terminal; and a gate electrode of the second transistor is connected with the first input terminal.

14. The touch driving unit according to claim 12, wherein: the first energy storage module includes a first capacitor; and a first end of the first capacitor is connected with the first node, and a second end of the first capacitor is connected with the second voltage-level terminal.

15. The touch driving unit according to claim 12, wherein: the second node control module includes a third transistor and a fourth transistor;

a first terminal of the third transistor is connected with the first voltage-level terminal; a second terminal of the third transistor is connected with the second node; a gate electrode of the third transistor is connected with the first input terminal; and a first terminal of the fourth transistor is connected with the second node; a second terminal of the fourth transistor is connected with the second voltage-level terminal; and a gate electrode of the fourth transistor is connected with the first node.

16. The touch driving unit according to claim 12, wherein: the second energy storage module includes a second capacitor; and a first end of the second capacitor is connected with the second node, and a second end of the second capacitor is connected with the second voltage-level terminal.

17. The touch driving unit according to claim 12, wherein: the first output module includes a fifth transistor, a sixth transistor, a seventh transistor, an eighth transistor, a ninth transistor, a tenth transistor and an eleventh transistor;

a first terminal of the fifth transistor is connected with the second clock signal terminal; a second terminal of the fifth transistor is connected with a first terminal of the sixth transistor; a gate electrode of the fifth transistor is connected with the second node;

the first terminal of the sixth transistor is connected with a gate electrode of the seventh transistor; a second terminal of the sixth transistor is connected with the second voltage-level terminal; a gate electrode of the sixth transistor is connected with the first node;

a first terminal of the seventh transistor is connected with the driving signal input terminal, and a second terminal of the seventh transistor is connected with the first output terminal;

a first terminal of the eighth transistor is connected with the first output terminal; a second terminal of the eighth transistor is connected with the common voltage input terminal; a gate electrode of the eighth transistor is connected with the first node;

a first terminal of the ninth transistor is connected with the first voltage-level terminal; a second terminal of the ninth transistor is connected with a gate electrode of the eleventh transistor; a gate electrode of the ninth transistor is connected with the fourth clock signal terminal;

a first terminal of the tenth transistor is connected with the first voltage-level terminal; a second terminal of the tenth transistor is connected with the gate electrode of the eleventh transistor; a gate electrode of the tenth transistor is connected with the third cock signal terminal; and a first terminal of the eleventh transistor is connected with the first output terminal, and a second terminal of the eleventh transistor is connected with the common voltage input terminal.

18. The touch driving unit according to claim 12, wherein: the second output module includes a twelfth transistor, a thirteenth transistor, a fourteenth transistor, a fifteenth transistor, a sixteenth transistor, a seventeenth transistor and an eighteenth transistor;

a first terminal of the twelfth transistor is connected with the third clock signal terminal; a second terminal of the twelfth transistor is connected with the second output terminal; a gate electrode of the twelfth transistor is connected with the second node;

a first terminal of the thirteenth transistor is connected with the second output terminal; a second terminal of the thirteenth transistor is connected with the second voltage-level terminal; a gate electrode of the thirteenth transistor is connected with the first node;

a first terminal of the fourteenth transistor is connected with the driving signal input terminal; a second terminal of the fourteenth transistor is connected with the third output terminal; a gate electrode of the fourteenth transistor is connected with the second output terminal;

a first terminal of the fifteenth transistor is connected with the third output terminal; a second terminal of the fifteenth transistor is connected with the common voltage input terminal; a gate electrode of the fifteenth transistor is connected with the first node;

a first terminal of the sixteenth transistor is connected with the first voltage-level terminal; a second terminal of the sixteenth transistor is connected with a gate electrode of the eighteenth transistor; a gate electrode of the sixteenth transistor is connected with the fourth clock signal terminal;

a first terminal of the seventeenth transistor is connected with the first voltage-level terminal; a second terminal of the seventeenth transistor is connected with the gate electrode of the eighteenth transistor; a gate electrode of the seventeenth transistor is connected with the second clock signal terminal; and a first terminal of the eighteenth transistor is connected with the third output terminal, and a second terminal of the eighteenth transistor is connected with the common voltage input terminal.

19. A driving method for driving the touch driving unit according to claim 12, comprising:

in a first stage of a display period; pulling the voltage of the first node to be equal to the voltage of the first voltage-level terminal through the first node control module under the control of the first clock signal of the first clock signal terminal; storing, by the first energy storage module, the voltage of the first node; outputting, at the first output terminal, the common voltage inputted by the common voltage input terminal through the first output module under the control of the voltage of the first node; and, through the second output module under the control of the voltage of the first node, pulling the voltage of the second output terminal to be equal to the voltage of the second voltage-level terminal, and outputting, at the third output terminal, the common voltage inputted by the common voltage input terminal;

in a second stage of the display period: outputting, at the first output terminal, the common voltage inputted by the common voltage input terminal through the first output module under the control of the fourth clock signal inputted by the fourth clock signal terminal; pulling the voltage of the second output terminal to be equal to the voltage of the second voltage-level terminal through the second output module under the control of the voltage of the first node; and outputting, at the third output terminal, the common voltage inputted by the common voltage input terminal through the second output module under the control of the fourth clock signal inputted by the fourth clock signal terminal;

in a third stage of the display period: outputting, at the first output terminal, the common voltage inputted by the common voltage input terminal through the first output module under the control of the voltage of the first node; pulling the voltage of the second output terminal to be equal to the voltage of the second voltage-level terminal through the second output module under the control of the voltage of the first node; and outputting, at the third output terminal, the common voltage inputted by the common voltage input terminal through the second output module under the control of the second clock signal inputted by the second clock signal terminal;

in a fourth stage of the display period: outputting, at the first output terminal, the common voltage inputted by the common voltage input terminal through the first output module under the control of the third clock signal inputted by the third clock signal terminal; pulling the voltage of the second output terminal to be equal to the voltage of the second voltage-level terminal through the second output module under the control of the voltage of the first node; and outputting, at the third output terminal, the common voltage inputted by the common voltage input terminal through the second output module under the control of the second clock signal inputted by the second clock signal terminal;

in a first stage of a touch period, pulling the voltage of the first node to be equal to the voltage of the second voltage-level terminal through the first node control module under the control of the first input signal inputted by the first input terminal; pulling the voltage of the second node to be equal to the voltage of the first voltage-level terminal through the second node control module under the control of the voltage of the first node and the first input signal inputted by the first input terminal; outputting, at the first output terminal, the common voltage inputted by the common voltage input terminal through the first output module under the control of the fourth clock signal inputted by the fourth clock signal terminal; and outputting, at the third output terminal, the common voltage inputted by the common voltage input terminal through the second output module under the control of the fourth clock signal of the fourth clock signal terminal;

in a second stage of the touch period: outputting, at the first output terminal, the driving signal inputted by the driving signal input terminal through the first output module under the control of the voltage of the second node and the second clock signal inputted by the second clock signal terminal; and outputting, at the third output terminal, the common voltage inputted by the common voltage input terminal through the second output terminal under the control of the second clock signal inputted by the second clock signal terminal; and in a third stage of the touch period: outputting, at the first output terminal, the common voltage inputted by the common voltage input terminal through the first output module under the control of the third clock signal of the third clock signal terminal; outputting, at the second output terminal, the third clock signal of the third clock signal terminal through the second output module under the control of the voltage of the second node, and outputting, at the third output terminal, the driving signal inputted by the driving signal input terminal through the second output module under the control of the third clock signal inputted by the third clock signal terminal.

* * * * *